(12) United States Patent
Rudduck et al.

(10) Patent No.: US 7,600,301 B2
(45) Date of Patent: Oct. 13, 2009

(54) FIXING AND RELEASE SYSTEMS AND FASTENER NETWORKS

(75) Inventors: Dickory Rudduck, Seaforth (AU); Lachlan Richard Goldspink, Paddington (AU); Geoffrey David Sizer, Pymble (AU); Lee David Blattmann, Castle Cove (AU); Edward David James Farren-Price, Balmain (AU); Joshua Robert Park, Redfern (AU)

(73) Assignee: Telezygology, Inc., Chicago, IL (US)

( * ) Notice: Subject to any disclaimer, the term of this patent is extended or adjusted under 35 U.S.C. 154(b) by 228 days.

(21) Appl. No.: 11/016,498

(22) Filed: Dec. 17, 2004

(65) Prior Publication Data
US 2005/0172462 A1 Aug. 11, 2005

Related U.S. Application Data

(63) Continuation-in-part of application No. PCT/AU03/00759, filed on Jun. 19, 2003.

(51) Int. Cl.
*F16B 19/00* (2006.01)
*F16B 1/04* (2006.01)
*F16B 21/06* (2006.01)
*A44B 21/00* (2006.01)

(52) U.S. Cl. .............................. 24/606; 24/602; 24/604
(58) Field of Classification Search ................... 24/306, 24/442, 457–459, 602, 604, 606; 292/84, 292/341.17, DIG. 66; 428/99, 100; 361/683, 361/685, 731, 732, 726, 747; 312/333; 369/75.1
See application file for complete search history.

(56) References Cited

U.S. PATENT DOCUMENTS

| 3,120,149 A | 2/1964 | Dickie |
| 3,134,404 A | 5/1964 | Ziccardi |
| 3,292,542 A | 12/1966 | White |
| 3,334,536 A | 8/1967 | Armstrong |
| 3,395,555 A | 8/1968 | Hickman |

(Continued)

FOREIGN PATENT DOCUMENTS

| AU | 44961/59 | 7/1959 |

(Continued)

OTHER PUBLICATIONS

"Simple Network—The Lin Bus" http://www.microchip.com/1010/edit/proceed/archive9_311/index.htm, Jan. 13, 2003.

(Continued)

*Primary Examiner*—Robert J Sandy

(57) ABSTRACT

In the first aspect, the invention provides a fastener which includes a fastening element and an actuating means attached to the fastening element. The fastening element has a flexible beam and an engagement means. The actuating means includes a material, such as shape memory alloy, which contracts when activated. When the material is contracted, the beam moves between an engagement position and a disengagement position.

In a second aspect, the invention provides a fastener for use in a network of fasteners. The fastener has address means which serve to distinguish the fastener from the other fasteners in the network. The fastener may be the same as the fastener in the first aspect of the invention, or a different fastener. A network or system of such fasteners is also provided.

In a third aspect, the invention provides, in a process for producing product, during which process there are a number of steps in which a first element is releasably fixed to a second element, the use of the fastener in the first aspect or the second aspect of the invention to releasably fix the first element and the second element. The invention also provides a computer system programmed to perform the process of the invention.

43 Claims, 31 Drawing Sheets

U.S. PATENT DOCUMENTS

| | | | |
|---|---|---|---|
| 3,596,958 A | 8/1971 | Bowerman | |
| 3,745,736 A | 7/1973 | Fischer et al. | |
| 3,783,429 A * | 1/1974 | Otte | 337/393 |
| 3,855,827 A | 12/1974 | Hallman et al. | |
| 3,911,534 A | 10/1975 | Martens et al. | |
| 3,940,935 A | 3/1976 | Richardson et al. | |
| 3,947,930 A | 4/1976 | Martens et al. | |
| 3,962,910 A | 6/1976 | Spyridakis et al. | |
| 3,974,669 A | 8/1976 | Stackhouse | |
| 4,006,567 A | 2/1977 | Flannery | |
| 4,012,813 A | 3/1977 | Martens et al. | |
| 4,016,914 A | 4/1977 | Zurko | |
| 4,096,802 A | 6/1978 | Waln | |
| 4,176,250 A | 11/1979 | Berglind | |
| 4,195,868 A | 4/1980 | Kalen et al. | |
| 4,223,799 A | 9/1980 | Eyster et al. | |
| 4,339,853 A | 7/1982 | Lipschitz | |
| 4,375,637 A | 3/1983 | Desjardins | |
| 4,382,711 A | 5/1983 | Lafosse et al. | |
| 4,425,117 A | 1/1984 | Hugemann et al. | |
| 4,453,449 A | 6/1984 | Hollmann | |
| 4,507,115 A | 3/1985 | Kambara et al. | |
| 4,515,045 A | 5/1985 | Gnatchenko et al. | |
| 4,518,285 A | 5/1985 | Weber et al. | |
| 4,523,356 A | 6/1985 | Charlot, Jr. | |
| 4,539,929 A * | 9/1985 | Sestak et al. | 116/221 |
| 4,559,512 A | 12/1985 | Yaeger et al. | |
| 4,586,335 A | 5/1986 | Hosoda et al. | |
| 4,602,908 A | 7/1986 | Kroeber | |
| 4,620,428 A | 11/1986 | Kopesky | |
| 4,624,443 A | 11/1986 | Eidsmore | |
| 4,651,136 A | 3/1987 | Anderson et al. | |
| 4,705,070 A | 11/1987 | Eidsmore | |
| 4,728,217 A | 3/1988 | Fink | |
| 4,767,337 A | 8/1988 | Kawasaki et al. | |
| 4,806,815 A * | 2/1989 | Honma | 310/307 |
| 4,829,767 A | 5/1989 | Mecca | |
| 4,841,100 A | 6/1989 | Ignasiak | |
| 4,845,998 A | 7/1989 | DeMartelaere et al. | |
| 4,855,729 A | 8/1989 | Takeuchi et al. | |
| 4,872,584 A * | 10/1989 | Sakai | 220/201 |
| 4,899,131 A | 2/1990 | Wilk et al. | |
| 4,919,464 A | 4/1990 | Richards | |
| 4,926,699 A | 5/1990 | Salce, Sr. | |
| 4,929,135 A | 5/1990 | Delarue et al. | |
| 4,934,885 A | 6/1990 | Woods et al. | |
| 4,960,760 A | 10/1990 | Wang et al. | |
| 4,994,722 A | 2/1991 | Dolan et al. | |
| 5,014,794 A | 5/1991 | Hansson | |
| 5,061,112 A | 10/1991 | Monford, Jr. | |
| 5,071,064 A | 12/1991 | AbuJudom, II et al. | |
| 5,076,623 A | 12/1991 | Richards | |
| 5,077,872 A | 1/1992 | Guthammar | |
| 5,095,417 A | 3/1992 | Hagiwara et al. | |
| 5,108,214 A * | 4/1992 | Milam | 403/28 |
| 5,120,175 A | 6/1992 | Arbegast et al. | |
| 5,145,227 A | 9/1992 | Monford, Jr. | |
| 5,160,233 A | 11/1992 | McKinnis | |
| 5,164,154 A | 11/1992 | Brown et al. | |
| 5,170,801 A | 12/1992 | Casper et al. | |
| 5,188,405 A | 2/1993 | Maccaferri | |
| 5,203,844 A | 4/1993 | Leonard | |
| 5,221,171 A | 6/1993 | Rudoy et al. | |
| 5,241,451 A | 8/1993 | Walburn et al. | |
| 5,254,837 A | 10/1993 | Grimaldi et al. | |
| 5,269,213 A | 12/1993 | Coneski et al. | |
| 5,337,459 A | 8/1994 | Hogan | |
| 5,366,254 A | 11/1994 | Tucchio et al. | |
| 5,387,110 A | 2/1995 | Kantner et al. | |
| 5,439,310 A | 8/1995 | Evenson et al. | |
| 5,466,083 A | 11/1995 | Hogg | |
| 5,476,014 A | 12/1995 | Lampe et al. | |
| 5,482,467 A | 1/1996 | Nolf et al. | |
| 5,485,733 A | 1/1996 | Hoffman | |
| 5,570,992 A | 11/1996 | Lemelson | |
| 5,600,977 A | 2/1997 | Piron et al. | |
| 5,629,662 A | 5/1997 | Floyd et al. | |
| 5,712,469 A | 1/1998 | Chaffin et al. | |
| 5,715,712 A | 2/1998 | West | |
| 5,771,742 A | 6/1998 | Bokaie et al. | |
| 5,775,524 A | 7/1998 | Dunham | |
| 5,831,820 A | 11/1998 | Huang | |
| 5,870,914 A | 2/1999 | Dawson | |
| 5,901,894 A | 5/1999 | Melocco | |
| 5,910,894 A | 6/1999 | Pryor | |
| 5,917,726 A | 6/1999 | Pryor | |
| 5,933,086 A | 8/1999 | Tischendorf et al. | |
| 5,964,487 A | 10/1999 | Shamblin | |
| 6,008,992 A * | 12/1999 | Kawakami | 361/726 |
| 6,084,498 A | 7/2000 | Stelter et al. | |
| 6,089,253 A | 7/2000 | Stehling et al. | |
| 6,244,889 B1 | 6/2001 | James | |
| 6,367,843 B1 | 4/2002 | Fetzer | |
| 6,438,954 B1 * | 8/2002 | Goetz et al. | 60/527 |
| 6,450,725 B1 | 9/2002 | Roth et al. | |
| 6,461,185 B2 | 10/2002 | James | |
| 6,499,907 B1 | 12/2002 | Baur | |
| 6,553,321 B2 | 4/2003 | Siegel et al. | |
| 6,588,790 B2 | 7/2003 | Hall | |
| 6,598,684 B2 | 7/2003 | Watanabe | |
| 6,666,330 B2 | 12/2003 | Sedon et al. | |
| 6,872,439 B2 * | 3/2005 | Fearing et al. | 428/99 |
| 6,944,920 B2 * | 9/2005 | Browne et al. | 24/442 |
| 6,966,781 B1 | 11/2005 | Bullinger et al. | |
| 7,217,059 B1 | 5/2007 | Rudduck et al. | |
| 2002/0040949 A1 | 4/2002 | Brei et al. | |
| 2002/0113499 A1 | 8/2002 | von Behrens et al. | |
| 2003/0019210 A1 | 1/2003 | Gummin et al. | |
| 2004/0003683 A1 | 1/2004 | Rudduck | |
| 2004/0104580 A1 * | 6/2004 | Spiessl et al. | 292/84 |
| 2006/0012191 A1 * | 1/2006 | Brei et al. | 292/341.17 |

FOREIGN PATENT DOCUMENTS

| | | |
|---|---|---|
| BE | 840618 A | 10/1976 |
| CN | 1320093 | 10/2001 |
| DE | 2003164 | 7/1971 |
| DE | 2552039 A1 | 5/1977 |
| DE | 19620782 | 12/1996 |
| DE | 10104833 | 8/2002 |
| EP | 0297552 | 1/1989 |
| EP | 0324083 | 7/1989 |
| GB | 1388973 | 4/1975 |
| GB | 2131869 A | 6/1984 |
| GB | 2260162 | 4/1993 |
| JP | 63191526 A | 8/1988 |
| JP | 8241753 A | 9/1996 |
| JP | 2001015956 A | 1/2001 |
| RU | 95-153470/20 | 8/1993 |
| RU | 1838548 | 8/1993 |
| RU | 2019739 C1 | 9/1994 |
| RU | 2065091 C1 | 8/1996 |
| RU | 2091554 | 9/1997 |
| RU | 2094325 | 10/1997 |
| SU | 787200 | 12/1980 |
| SU | 1348125 | 10/1987 |
| WO | WO-95/31313 | 11/1995 |
| WO | WO-96/09870 | 4/1996 |
| WO | WO-96/23942 | 8/1996 |
| WO | WO-99/43961 | 2/1999 |
| WO | WO-99/47819 | 9/1999 |
| WO | WO-00/64639 | 11/2000 |
| WO | WO-01/69547 | 9/2001 |
| WO | WO-02/07971 | 1/2002 |

| | | |
|---|---|---|
| WO | WO-2004/001235 | 12/2003 |
| WO | WO-2004/010011 | 1/2004 |
| WO | WO-2004/046568 | 6/2004 |
| WO | WO-2004/082444 | 9/2004 |
| WO | WO-2004/085860 | 10/2004 |
| WO | WO-2004/101216 | 11/2004 |

OTHER PUBLICATIONS

"OBD-II," http://obdii.com/background.html, Jan. 11, 2003.
"Target Applications," http://www.lin-subbus.org/main.asp?cls=online&method=view&id=970, Jan. 13, 2003.
Nice, K.: "How Car Computers Work," http://howstuffworks.lycoszone.com/car-computer.htm/printable, Jan. 11, 2003.
International Search Report for International Patent Application No. PCT/AU03/00759, filed Jun. 19, 2003.
"Magnetic Lock", Aug. 28, 2002.
ENVIROEQUIP, "A Locking Well Cap with a Magnetic Key", Aug. 30, 2002.
CARFIX "Magnet Seat Belt", Aug. 29, 2002.
Custodian® Hydrant Lock, Sep. 9, 2002.
Warwick Manufacturing Group "Magnetic Lock Holds Injection Molding Tools", Sep. 9, 2002.
Protect Enfant Inc. Cabinet and Drawer Magnetic Latch, Sep. 9, 2002.
Nova Design Group, "Nova Bi-Polar Device", Sep. 9, 2002.
SEGUFIX "Bandage System: Component Parts", Sep. 9, 2002.
Security Co. "MagLatch Series", Sep. 9, 2002.
SEGUFIX "Segufix Bandage System", Nov. 29, 2002.

* cited by examiner

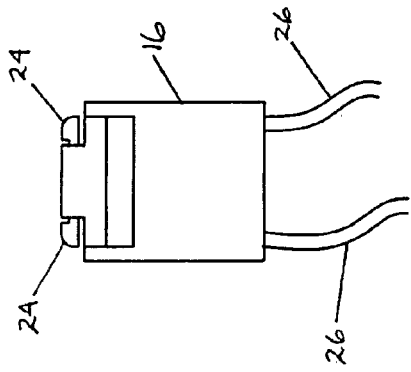
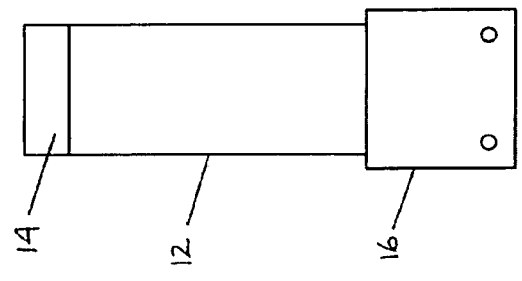
Figure 12
Figure 11
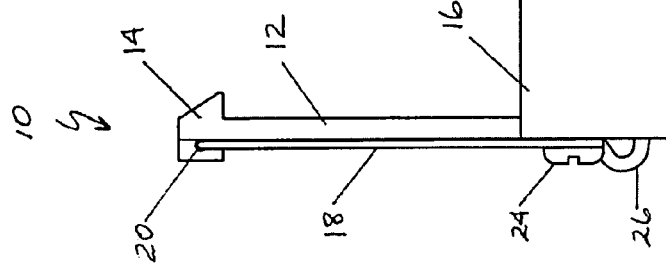
Figure 10
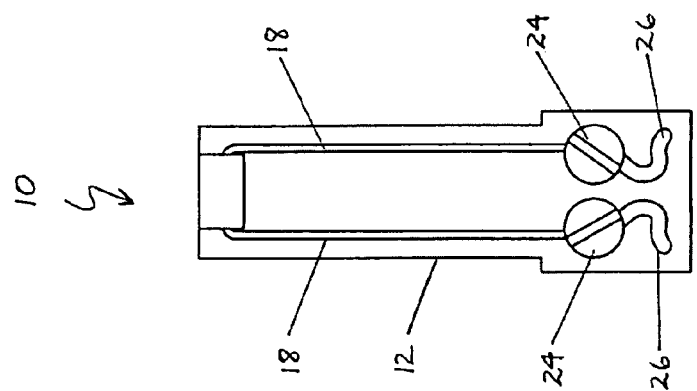
Figure 9

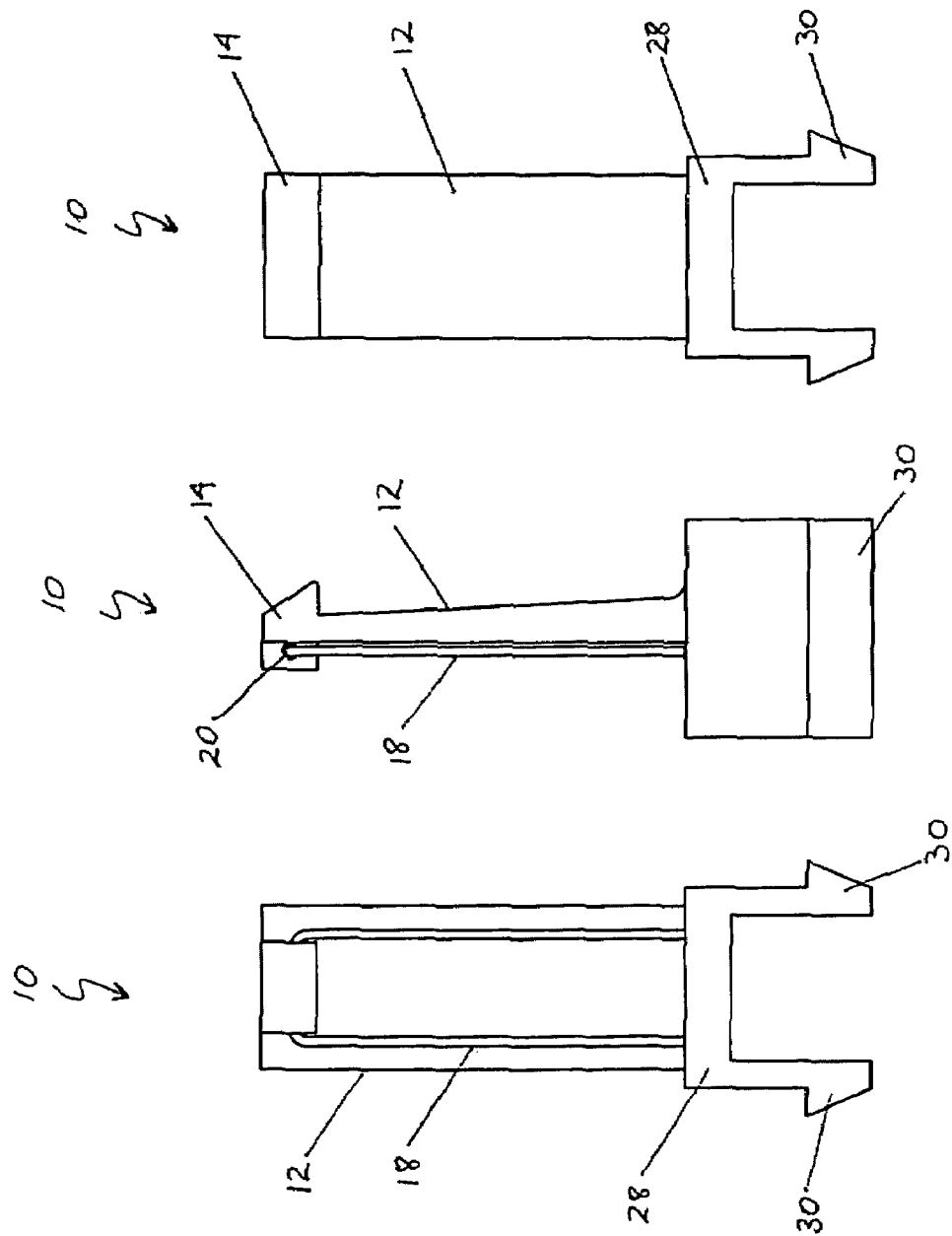

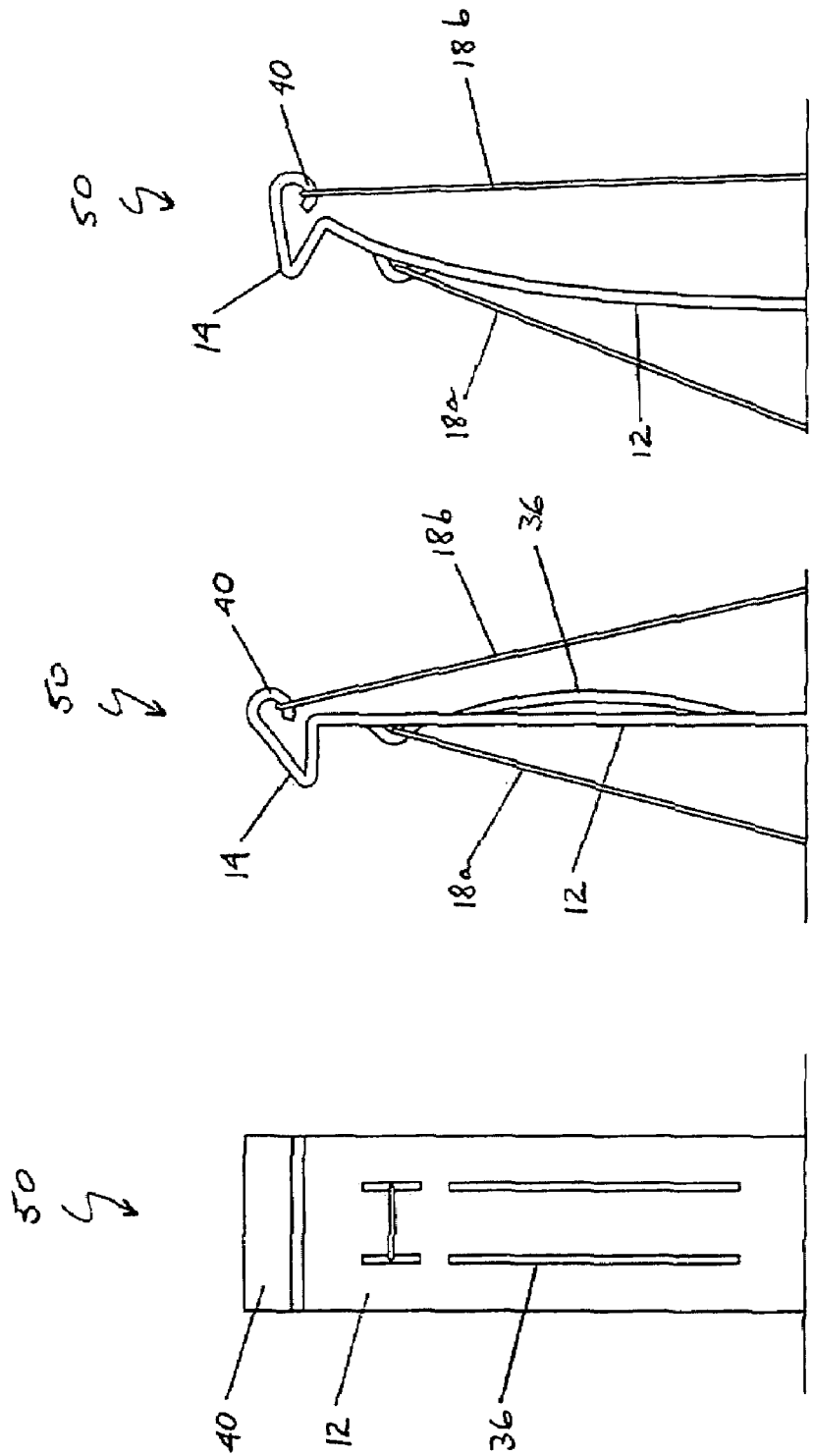

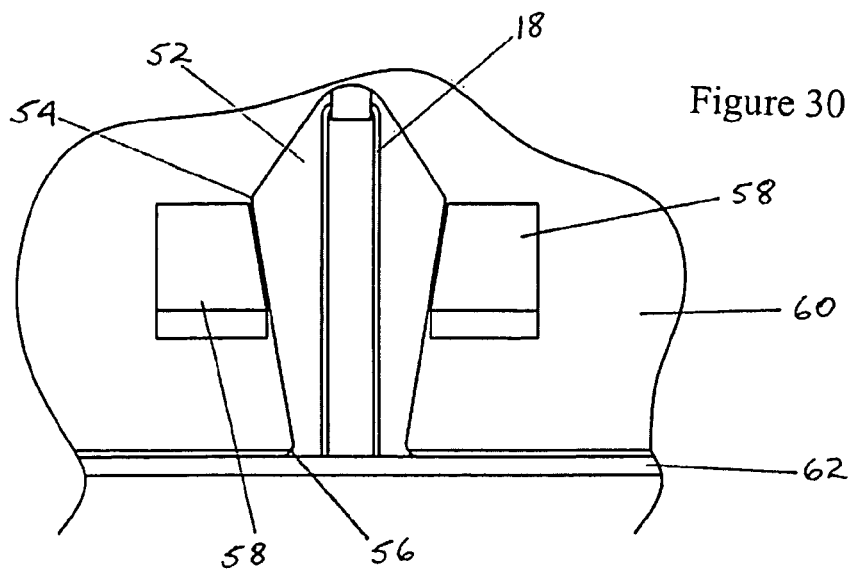
Figure 30
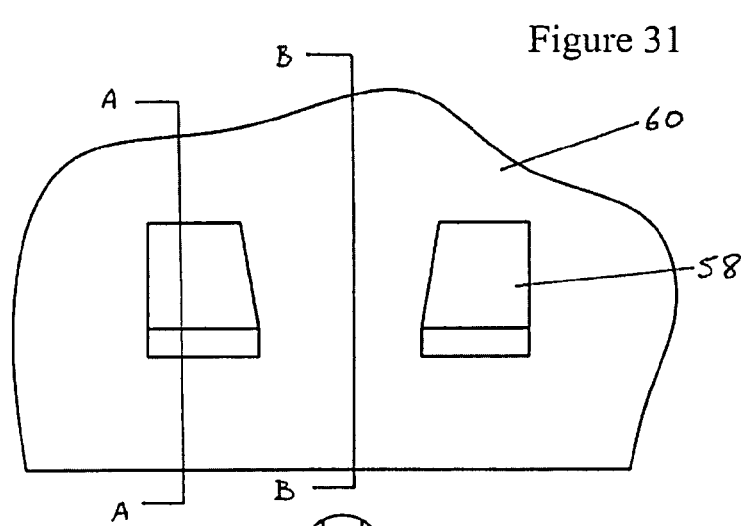
Figure 31
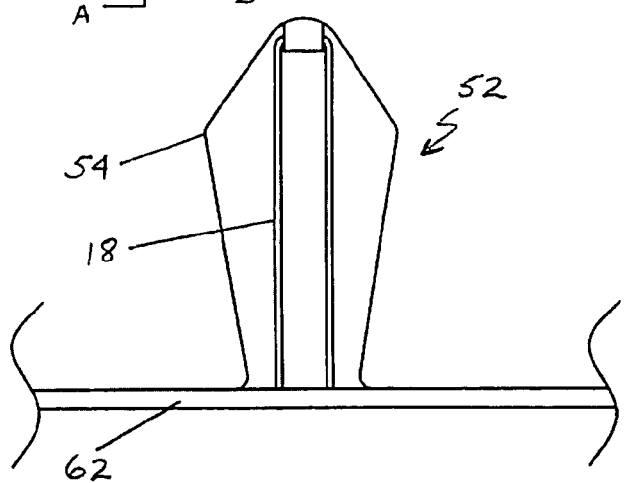
Figure 32
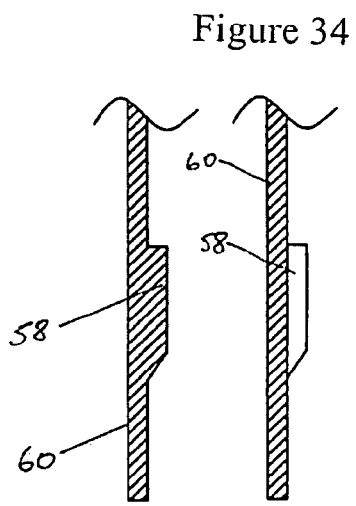
Figure 34
Figure 33

Figure 39
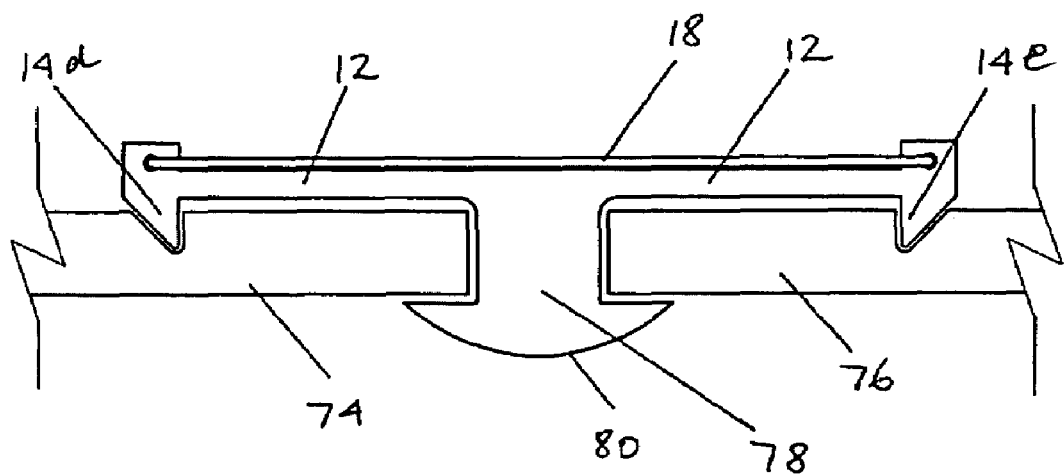
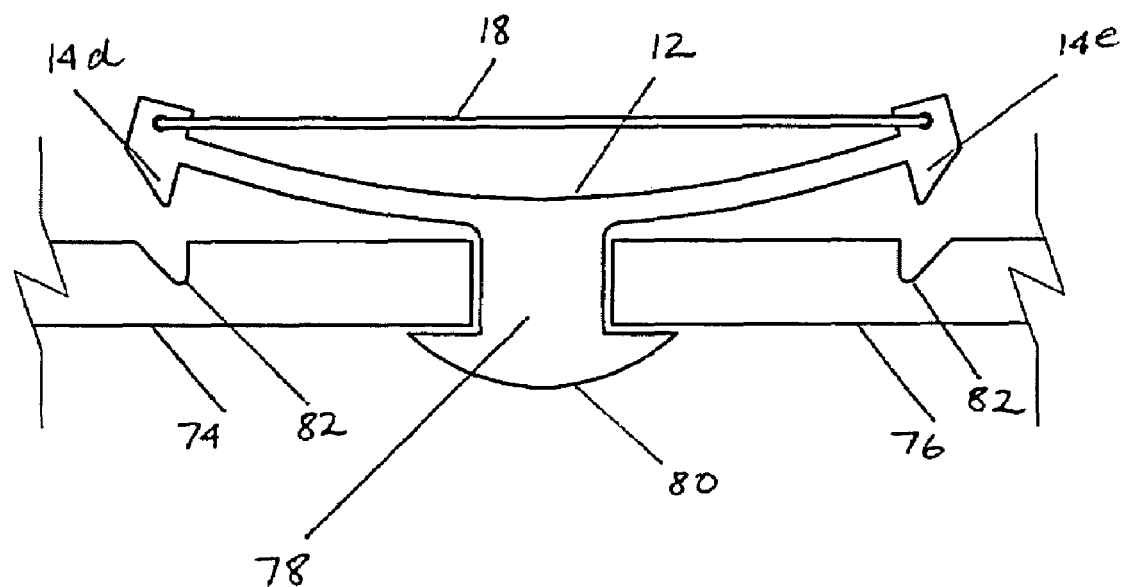
Figure 40

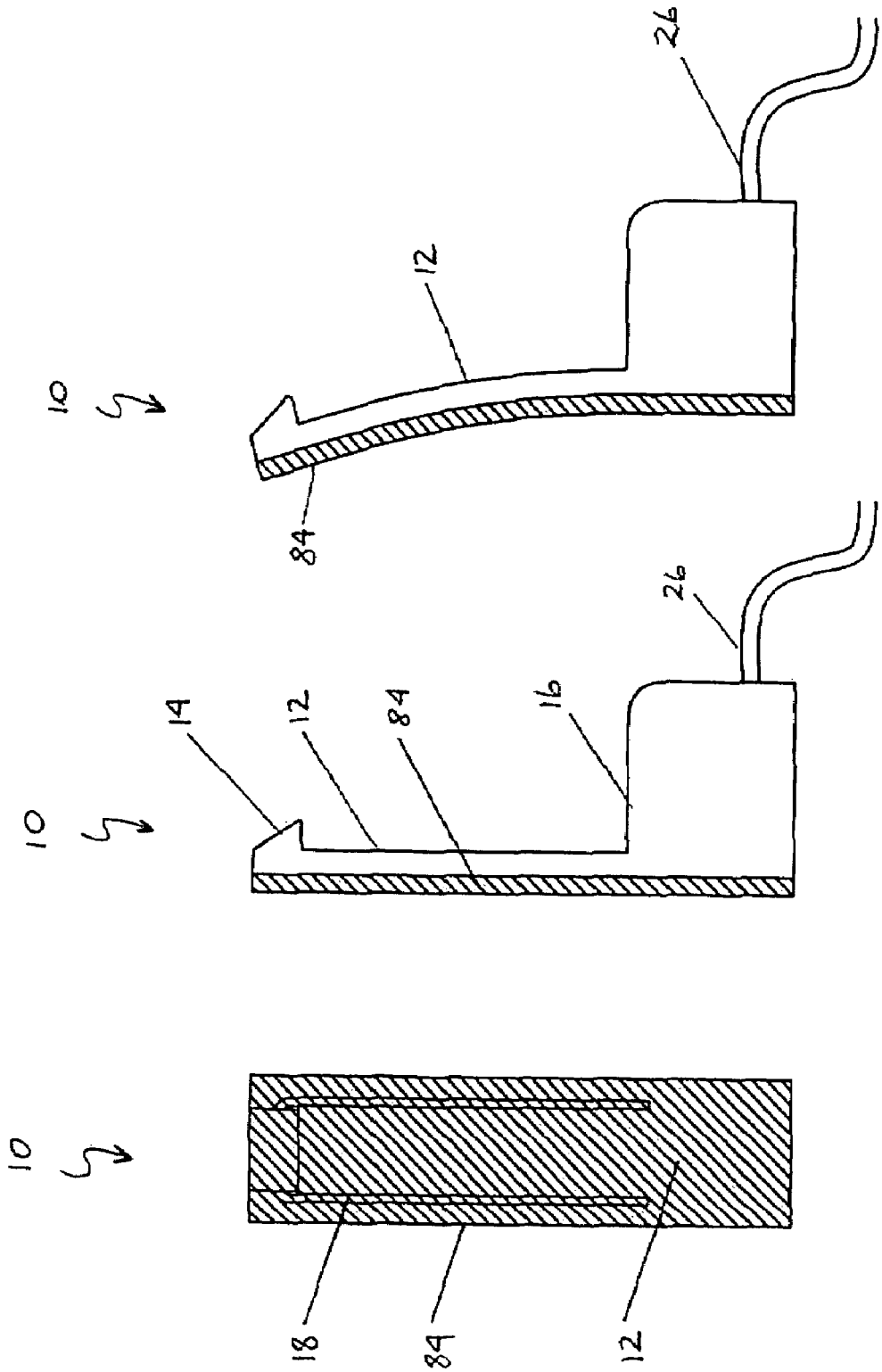

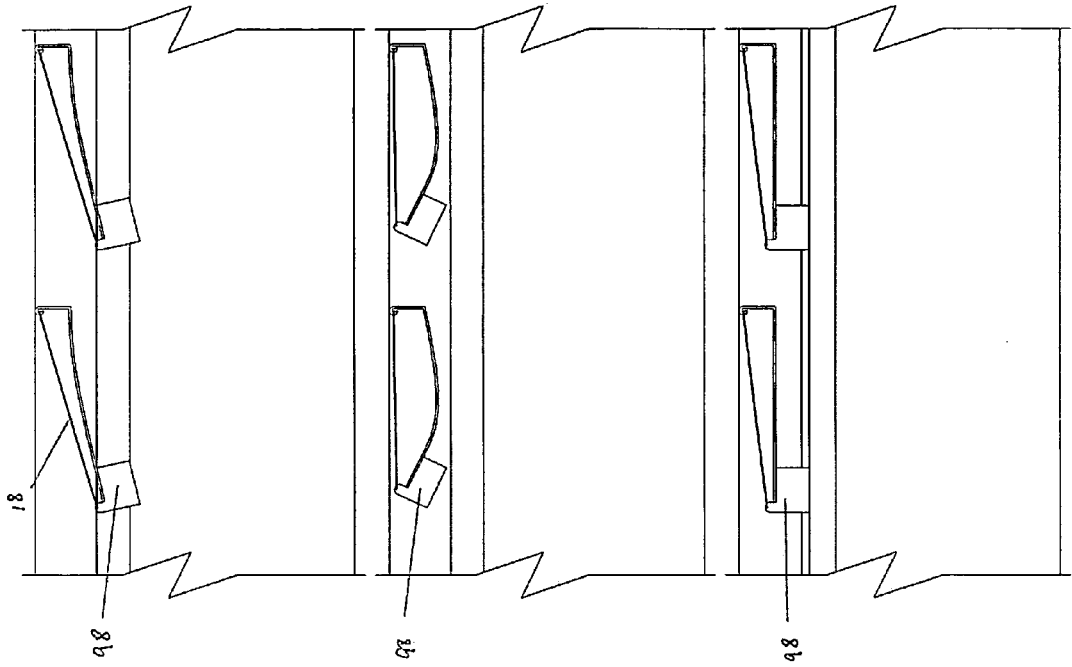
Figure 59
Figure 60
Figure 61
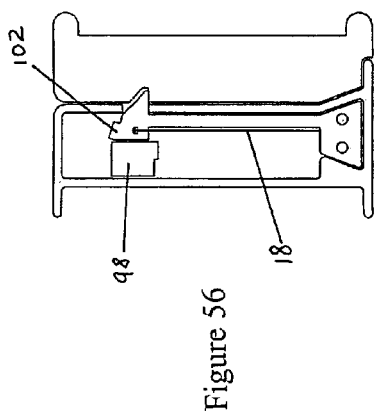
Figure 56
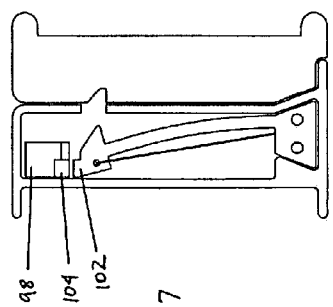
Figure 57
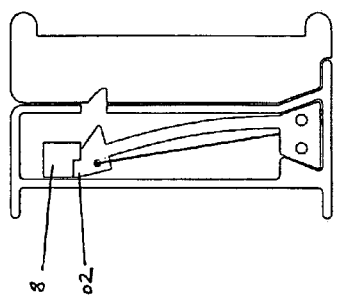
Figure 58

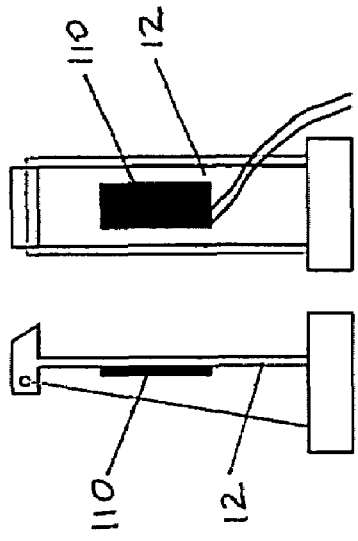
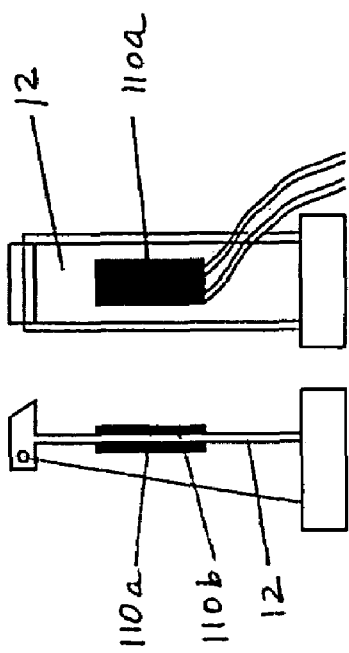
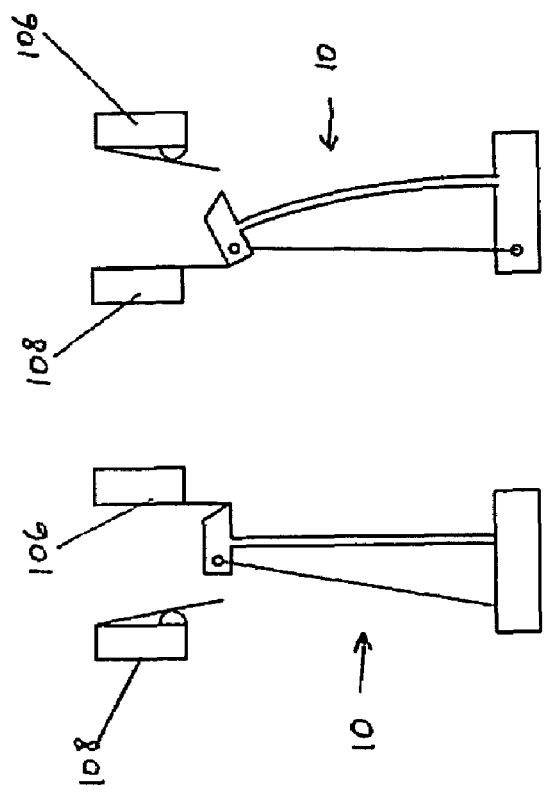
Figure 64  Figure 65
Figure 66  Figure 67
Figure 62  Figure 63

FIXING AND RELEASE SYSTEMS AND FASTENER NETWORKS

RELATED APPLICATIONS

This application is a continuation-in-part of International Application No. PCT/AU2003/000759, filed Jun. 19, 2003, which was published under PCT Article 21(2) in English and is incorporated herein by reference. International Application No. PCT/AU2003/000759 claims priority from Australian Patent Application No. PS 3123, filed Jun. 19, 2002, which is incorporated herein by reference. This application is also a continuation-in-part of Australian Patent Application No. 2004901367, filed on Mar. 16, 2004, which is also incorporated herein by reference and to which priority is also claimed.

TECHNICAL FIELD

This invention relates to fixing and release systems. In some aspects, the invention represents an improvement in the fixing and release systems disclosed in International Patent Application No. PCT/AU99/00185 (published as WO 99/47819), the contents of which are imported herein by reference.

BACKGROUND ART

International Application No. PCT/AU99/00185 (referred to below as the International Application) disclosed several aspects of systems for fixing or releasing a first element and a second element. In one aspect, a fastener was adapted to releasably fix the first and second elements and included a locking means moveable by remote activation between a locked position and an unlocked position. There was no permanent material connection between the fastener and the remote activation means. A "material connection" was defined as a connection which had physical substance, i.e. substance made of matter, and excluded a connection made through energy.

Various examples of remote activation means were given. These included the use of magnetic attraction or repulsion, the use of high-frequency heating or radio frequency heating, the transmission of a message via radio or other waves, and so on.

It has now been found that certain "smart" materials may be adapted for fixing and release systems which have different features from the remotely activated systems referred to above and that such materials can have substantial advantages when applied as part of the invention described below.

Part of the motivation for the present invention in a first aspect was the desire to provide a fastener which is useful in assembly and also in disassembly. Disassembly is becoming increasingly more important with an increase in social pressure to recycle components, for example, those in mobile or cellular telephones. The invention is also based on the desire to provide a system of fasteners which can be part of an array, which can be individually addressable and which can enable an orderly, predictable way of accessing replaceable components in assemblies, for example, in order to remove a radio unit from a motor vehicle.

At least in some embodiments, the present invention finds a basis in the desire to utilise computer systems already established in many vehicles. One example of these is controller-area networking (CAN), in which modules communicate data on to a bus, usually requiring two wires; another example is the local interconnect network (LIN) bus, which uses a single wire and a single master/multiple slave configuration. The fasteners of the present invention may be useful in connection with these other "On Board Diagnostic Systems".

The smart materials with which this invention is concerned (at least in the first aspect) are those known as "shape memory" materials. Currently, the best known of these is a shape memory alloy, predominantly or wholly made of titanium and nickel, but which may also include other material, such as aluminum, zinc and copper. Such a shape memory alloy is capable of adopting one shape below a predetermined transition temperature and changing to a second shape once its temperature exceeds the transition temperature. Conversely, when the shape memory alloy cools below the transition temperature, it is capable of adopting the first shape again.

While this invention encompasses use of the shape memory alloy referred to above, it is not limited to this material. It is contemplated that other suitable materials may exist now or may come into existence in the future which can be substituted for the shape memory alloy.

In a second aspect, this invention is concerned with a network of fasteners.

Monitoring of equipment status is becoming increasingly important. As one example, an aircraft monitoring system has been introduced recently under the name "Airplane Health Management". The intention of such a monitoring system is to assist in streamlining aircraft maintenance and to minimise disruption to flight schedules.

A monitoring system such as the "Airplane Health Management" system desirably can carry out the functions of collecting data about the aircraft or other equipment being monitored and transmit the data to a central or remote processing system. For the aircraft example, the remote processing system may be on board the aircraft or it may be on the ground, so that problems, or potential problems, have already been identified before the aircraft lands. Maintenance can then be ready with the necessary labour schedule and/or parts to service the aircraft.

It is understood that aircraft maintenance is a significant cost, which at present is continuing to increase. It is also understood that a 10% reduction in maintenance costs may increase net profit by up to 40%.

It is an object of this invention to facilitate monitoring systems, especially monitoring systems in aircraft, but not limited to that application. It is a further object of this invention to enable not only monitoring but also a system which enables an action to be taken in response to the situation monitored.

DISCLOSURE OF THE INVENTION

First Aspect

In a first aspect, this invention provides a fastener which includes:
(a) a fastening element having a flexible beam and an engagement means; and
(b) actuating means attached to the fastening element and including a material adapted to contract when activated;

wherein the beam is moveable, upon contraction of the material, between an engagement position and a disengagement position.

The fastener of this first aspect of the invention may be made of any suitable material, including plastic or metal. The fastener may be made of a combination of materials.

The flexible beam should have flexural modulus which is sufficiently low to enable the actuating means to move the beam in the desired manner. However, the tensile strength of the beam should be sufficiently high that the fastener can fasten useful loads. Preferably, the material of the beam has sufficient fatigue strength to accommodate the desired number of locked/unlocked cycles.

When the beam is made of metal, this is preferably spring steel, a beryllium-copper alloy or a titanium-copper alloy. The beam may be machined, cast, moulded or formed in any desirable way. For example, the beam can be made of braided flexible cable.

The engagement means preferably takes the form of a projecting wedge which can key into a corresponding recess in a wall of an element. Other configurations are possible. For example, the engagement means may be a snap means, a rod for latching over a hook, or an aperture which can latch over a projection such as a peg. The engagement means may take the form of a dovetail on the beam fitting into an appropriate recess. The fastener of the invention can engage with an identical fastener, for example.

Preferably, the material, which contracts when activated, is a shape memory material as has been discussed above. Preferably, the shape memory material is a titanium-nickel wire which, when sufficient energy in the form of an electrical current is applied, heats to or above a temperature at which the material shrinks by about 4 to 5%. As will be seen from the discussion in connection with the drawings, below, on application of energy such as electrical energy in order to generate heat above a predetermined level, the flexible beam can be caused to bend away from the engagement position in which a first element is fastened to a second element, thereby releasing the elements. Conversely, if the shape memory material is permitted to cool below the transitional temperature, in some embodiments the beam may assume the engagement position and the elements may be fastened again.

In certain embodiments, once the shape memory material has caused the beam to move to the disengagement position, it can be maintained in that position for a desired length of time, possibly by being maintained in a "hold" state. Such a hold state may be established using less power (such as electrical current) than that required to move the beam from the engagement position to the disengagement position. This may be achieved, for example, by insulating the actuating means, for example, by maintaining an insulating tube around the actuating means. Such a tube may comprise or include Teflon or other insulation. If the insulation is suitable, the shape memory material may successfully maintain the beam in a disengagement position using an electrical current (or other energy), which is less than that required to move the beam to the disengagement position in the first place.

Another way to reduce the amount of energy required to maintain the beam in the "hold" state in this embodiment is to provide one or more barriers to interfere with air convection.

Shape memory alloy is known to require a relatively long time to cool—for example, as long as 4 to 5 seconds. If this is undesirable, the shape memory alloy may be covered with a heat sink material which can reduce cooling time. The use of materials such as rubber, silicone or polyurethane directly on a shape memory alloy can help reduce cooling time. This may, however, have a negative effect in increasing the amount of power required to heat the shape memory alloy. If Teflon tubing is used for insulation, as set out above, it may be desirable to place copper tubing over the Teflon tubing, since copper tubing is highly efficient at conducting heat away from the shape memory alloy and hence reducing cooling times.

The fastener of the invention may take the form of a monostable, bistable or multistable clip. As an example of a monostable clip, the flexible beam is resilient and the shape memory material takes the form of a titanium-nickel wire joining the flexible beam to a base. When the wire is heated to a sufficient temperature, shrinkage occurs and the resilient beam bends to accommodate the shrinkage. When the wire cools below the relevant temperature, it elongates. The bias of the resilient beam causes the monostable clip to resume the original position.

As a first example of a bistable clip, the beam has two stable positions, one holding the beam in the engagement position and the other holding the beam in the disengagement position. As a second example, the beam lacks any bias which would hold the beam in the engagement position. In either example, there may be two pieces of the titanium-nickel wire joining the flexible beam to the base. One wire is on one side of the beam and the second wire is on the other side of the beam. Each wire can be activated separately. When the first wire is activated, it shrinks and distorts the beam in one direction, to the disengagement position. The beam stays in that configuration when the wire cools. In order to move the fastener to the engagement position, it is necessary to activate the second wire by the use of suitable heat, so that the second wire shrinks and draws the fastener back to the first position. A bistable clip can be used in situations where it is desirable to maintain the disengagement position without having to maintain a supply of energy (such as heat).

In the case of a multistable clip, the actuating means is capable of moving the beam to a number of positions, for example, in incremental steps.

It is within the scope of the first aspect of the invention that the fastener may be locked in the engagement position, in the disengagement position or in any intermediate position. The locking means may be any suitable means known in the art. By way of example, the locking means may trap the beam or engagement means or may block the beam or engagement means from moving out of the locked position. This can be useful, for example, if the fastener of the invention is used to fasten a door.

In one embodiment, the material which contracts when activated is preferably in the form of a wire, forming a "backbone" to the beam. In another embodiment, the material may take the form of a strip. In either case, the material may run along most of the length of the beam or it may be fixed at or near the head of the beam and run at an angle. The material may be attached by any suitable means, including threading through an aperture or channel, screw attachment, moulding, coating, encapsulation within another material and so on.

Especially when the material is in the form of a wire, it may be convenient to attach the wire to a piece of non-conductive high tensile wire, such as nylon or Kevlar, so as to form a loop of the smart memory alloy wire with the non-conductive high tensile wire. Connection can take place by way of crimping. If the beam is provided with a hook at either end, the loop can be attached to the beam via the hooks, the crimping points serving as points for electrical wires to be soldered to the fastener for provision of power. Such fasteners may be produced by injection moulding in plastic or formed from metal with simple assembly in crimping the wire into a loop and clipping it into place. It is anticipated that the cost of such a fastener would be extremely low.

It is to be understood that the material which contracts when activated is not limited to wire or strips. By way of further non-limiting example, the material may be sprayed onto the beam by sputtering or other technique.

The energy to be applied to the material so that it may assume the disengagement position is preferably heat energy caused by application of an electric current. Other forms of energy may be suitable. In the case of heat energy generated by an electric current, this may be effected in any suitable way.

The fastener may be a discrete fastener or a linearly extended fastener which can provide a continuous engagement strip. In the case of the discrete fastener, terminals in the base of the fastener may be used to connect to an electric supply. In the case of the linear form of fastener, one or more buses may be incorporated in the fastener in order to transmit electrical energy along the length of the linear fastener. In a preferred embodiment, a metal wire lashing may connect one bus to another along the length of the fastener. The lashing may be integrated with the fastener.

The beam may be attached to or integral with a base. Preferably, the engagement means is located at the opposite end of the beam to the base.

The fastener of the present invention can be constructed in an extremely inexpensive way, compared to other forms of fasteners. For example, the fastener of the present invention can replace solenoids in many applications. The fastener of the invention may, at least in some embodiments, be regarded as a hybrid between latching and fastening. The invention is particularly useful in security situations, since all fixing can be inaccessible once the assembly is constructed.

It will be readily appreciated by one skilled in the art that in one embodiment the fastener of the invention can be constructed using only two parts, the fastening element with integrated beam and engagement means being one part and the actuating means being the other. This can have substantial advantages in not only requiring fewer parts but also less assembly, lower cost and greater reliability.

The fastener may fasten a first element to a second element and may be integral with, for example, the first element, or may be separate from it. It is an important aspect of this invention that it is possible to form the fastener integrally with or from the element. For example, the fastener can be integrally moulded into a product casing, or formed from the edges of a metal panel.

The first element and the second element can each be chosen from a wide range, as was the case with the International Application. Also, as was the case with the International Application, there may be more than two elements which are fixed or released. For example, one first element may be fixed to or released from a plurality of second elements; a plurality of first elements may be fixed to or released from a single second element; or a plurality of first elements may be fixed to or released from a plurality of second elements. Further, where there is a plurality of elements, these need not be identical. A plurality of first elements may differ from one another; a plurality of second elements may differ from one another.

The fastener of the invention may be of one or more parts and may be integrated with one of the elements it is intended to fasten, or it may be attached to such an element by adhesive, by snap-fit or by other suitable means.

The fastener of the present invention is capable of application in a wide number of industries. For example, the fastener of the invention can be used to retain glass in a window or a panel within a frame or on a support. Using the fastener of the invention, there need be no fastening means visible externally. The window or panel can be secure in that it may not be released unless the fastener is caused to adopt the disengagement position. Thus, the fastener can fix a first element (the pane of glass or the panel) to a second element (the window frame or other frame). Another example is the fixing of a building panel to an underlying infrastructure, such as a stud.

In these embodiments, the fastener of the invention can take the form of one or more discrete locking points or a continuous locking point, such as in the linear form of the fastener. Multiple locking points can give added security, for example, in locking a window.

The fastener of the invention is eminently suitable for use in situations where tampering or vandalising is to be prevented or discouraged. As one example, light fittings in public conveyances, such as trains, can be secured by the fastener of the invention. These can replace the need for tamper-proof screens and other unsightly barriers. Other examples are as follows: access panels in buildings, for example, for alarm systems, safety equipment and so on, covers for lights in buildings, covers for traffic lights, phone boxes and parking meters and enclosures for signage systems, such as at bus shelters and on shop fronts.

If exposed to external elements, it may be preferred to include a seal or insulating material in the assembly, in order to protect the fastener from undesired temperature fluctuations.

When the energy applied is an electric current, this may be sourced from a normal power supply or provided by a discrete power supply, such as a battery. Thus, the fastener of the invention can be used to fix, for example, a first element being a closure, to a second element, being a receptacle, such as a bottle. In this embodiment, the power may be supplied by a battery within the closure, or by power supplied externally from a separate power source.

The fastener of the invention can be adapted to a wide range of applications.

As one example of use of the fastener of the invention, the fastener can close a flap on a mailbox, for example, being one of an array of mailboxes in a home unit building. In this case, insertion of an electronic access card may be required to authorise a supply of power to the fastener to cause it to be activated and allow the flap to be disengaged from the mailbox, permitting access to the mailbox.

The fastener of the invention can be relatively small in size: this contributes to its usefulness in a wide variety of situations.

A significant application for the fastener of the invention is in holding together the casings for products, allowing disassembly. It has already been set out above that disassembly is becoming increasingly more important, especially in connection with product recycling. The fasteners of the invention can provide a simple and relatively inexpensive system for assembly and disassembly. For example, consider a two-part plastic casing. One part may be relatively simple, forming a lid, while the other part may contain the fasteners of the invention and the supporting electronic system.

As a more sophisticated example, the fasteners of the invention may be embedded into the product itself, to allow parts and subassemblies of the product to be removed on command. Like materials can be removed at the same time. Parts can be removed in an efficient sequence. Parts and subassemblies can be recovered quickly and without damage.

The fastener of the invention can have particular application in relation to other types of assembly and disassembly. For example, the assembly and disassembly of vehicles is usually complex. If it is desired to replace a part, often it is necessary to undergo a complex series of steps in order to access the part to replace it. Using the fastener of the present invention, especially in addressable form, it can be possible to greatly simplify the disassembly procedure by releasing only those fasteners which need to be released in order to access the part in question. For instance, if it is desired to exchange a radio mounted in the dashboard of a vehicle, if appropriate addressable fasteners of the invention are used, the process can be operated via a relatively simple computer, such as a palm-sized computer programmed with the address of the appropriate fasteners. Data can be transmitted via hard wiring or by other means, such as infra-red transmission in order to cause release of the fastener in any suitable manner. Only the relevant fasteners in the dashboard fascia need to be released in order to remove the radio. The process can be reversed for reassembly.

The fastener of the invention can be particularly useful in the building industry and in connection with large buildings which tend to have embedded "intelligence". For example, if data buses (wired or wireless) run through a building, the fastener of the invention can be included in appropriate networks for a myriad of fastening applications. Even access to the intelligence system itself can be secured by use of the fasteners of the invention. For example, the need to have lockable, sealed or tamper proof screws can be eliminated because the fastener of the invention can be inaccessible after fixing has taken place and can be designed for release upon a suitable command and energy application controlled by the building's intelligence. On a more local scale, access to an area protected by a fastener of the invention can be effected via a key pad which can deliver the appropriate instruction to the power source which can then cause the fastener to deform and thus release.

The fastener of the invention, in intelligent form, can be used to enhance quality control and speed of assembly, as well as to provide controlled disassembly. While this aspect of the invention has application in a large range of areas, it is described herein in relation to a convenient example—that of vehicle assembly. Because the intelligent fastener of the invention can be addressable, individually or in groups, and in a programmed way, it is possible to replace a defective part or change a chosen option on a vehicle during assembly; the assembly line is no longer constrained in the manner presently known. As a simple example, once "options" are chosen on a motor vehicle and installed, it is usually impossible to change the chosen option—for example, by substituting a CD player for a radio in a vehicle. The present invention enables such an exchange to take place because it is not necessary to undergo the tedious disassembly required under prior art procedures. When the intelligent fastener of the present invention is used in the construction of the relevant part of the vehicle, the part (such as the radio) can be easily changed by instructing the release of only the relevant fasteners. The instruction can be embedded in software which can be carried in a portable or other computer, for example.

Not only does this type of construction have wide ramifications for assembly lines, but it also provides security, as already mentioned, since (in this example) the car radio or CD player cannot be removed from the vehicle without having the necessary instructions conveyed to the fastener to release the part. This also has ramifications in that, because assembly and disassembly can be far more computerised than at present, intensive education is not required and skilled labour can be reduced.

In the maintenance and repair industry, the fastener of the invention can have decided advantages. As already mentioned, vehicles are being constructed with local computer networks. This existing technology can be easily adapted to accommodate the intelligent fastener of the present invention. Consequently, it is contemplated that when, for example, a headlight bulb in a vehicle needs replacing, all one will require is an access code (which can be imprinted on the correct replacement part), which can be entered into a suitably programmed computer, such as a palm-sized computer, which will then direct the user as to the steps to be taken and address the necessary fasteners, causing their release by the input of appropriate energy. Reassembly can similarly be computer directed.

As an alternative, a vehicle or other assembly could be constructed so that, if a part failed, the fastener holding it in place would be automatically released for access, so that the part could be replaced.

An important aspect of the fastener of the present invention is that it may be very simple, as well as inexpensive. Because of this, it is feasible to use the fastener of the invention in a "redundant" way. Redundancy can improve reliability by replicating one or more parts of the fastener any number of times. A redundant configuration can ensure that if any element fails, a redundant element can continue to enable the function of a fastener to be fulfilled. This is particularly significant in systems where there is a number of fasteners of the invention, such as the "intelligent" fastening systems described in greater detail below.

The fastener itself may have inbuilt redundancy. For example, if the actuating means is a wire, the fastener may contain two such wires, either of which is able to operate the fastener. If one wire fails, the other can perform the necessary function in moving the beam.

There is another way in which the fastener of the invention can be used in a redundant system. By way of example, the International Application refers to remotely activated locking means in a fastener. An assembly could be made with two types of fastener available to fix or release a first element and a second element. One type of fastener could be the remotely activatable type referred to in the International Application. The second type could be the fastener of the present invention. In this example, normally, fixing and release would be effected via the remotely activated fastener. However, in case of any failure, fixing or release could be effected via the fastener of the present invention.

As another example of redundancy, identical fasteners of the invention may be provided in duplicate, with either fastener being able to function singly as the fastener in the system. If the first fastener fails, the second, identical fastener is available to perform its function.

As an example of "double redundancy", two separate fasteners of the invention may be provided, each of which singly is able to perform the fastening function. Each fastener has duplicated actuating means, either of which is able to move the beam. This configuration could withstand a single failure of a fastener or a single failure of an actuating means, and some combinations of two or more failures.

The fastener of the invention may be "intelligent" or "not". As an example of a fastener which has no intelligence, reference is made to instances of the fastener referred to above, where the energy required to convert the shape memory material may be derived from a switched bus, for example. The intelligent version of the fastener of the invention is preferably addressable. In this instance, the fastener will require a supply of energy (such as power) together with a supply of data. The fastener can be made in an intelligent form, for example, by including an embedded switch and processor. This permits the addressing of the fastener, on an individual basis, or as part of a group, for switching or release of a part. It will be readily appreciated that this form of "smart clip" has multiple application in a large variety of areas. It is eminently suitable for environments which already have power and, possibly, data provided. It may be used for latching, particularly where multiple diverse points are required, such as around a door perimeter or in the case of mailbox arrays as discussed.

In connection with addressability of the fastener, on an individual basis, or as part of a group, it will be appreciated that this enables a plurality of fasteners to be activated in a chosen sequence. Consequently, one or many elements can be released in a chosen sequence and, likewise, elements can be fixed together in a chosen sequence.

The fastener of the invention may be part of network. Such a network may be spread throughout a building, or throughout a motor vehicle or aircraft, for example. A plurality of the fasteners may be connected to a central data processor/programmable solid state switch which, when fed with suitable data, causes one or more of the fasteners to receive the required amount of power to release one element from another element. In such a network, each fastener may be activated individually or in smaller or larger groups.

As well as providing a fastening function, the intelligent form of the fastener of the invention may have a second function which makes use of the intelligence and switching capacity of the fastener.

A simple example is a vehicle which has several of the fasteners of the invention in intelligent form. The fasteners have a first function which enables the fixing and releasing of light bulbs in the vehicle. The fasteners have a second function, which is to sense the amount of ambient light and to turn the light bulbs on or off depending on the amount of light sensed. One group of such fasteners may be adapted to turn on or off parking lights for the vehicle. Another group of the fasteners may be adapted to turn on or off the headlights. Data as to the amount of ambient light sent to a central processor activates the first fastener or the second fastener or both, according to desired criteria as to automatic switching on of the chosen lights.

When the fastener of the invention is part of a network, the network may be constructed in any suitable manner. Preferably, the network forms a star or a daisy chain. When the network forms a star, a power switch or processor is located in the center of the star, with each of the fasteners being separately connected to the central power switch/processor. In the case of a daisy chain, the connectors are arranged in a series, with a power source in the chain. Optionally, a data feed may also form part of the chain, using the power cable or separate data cables.

Especially in the case of the network of fasteners, the fastener may include a sensor able to convey information as to the condition of the fastening element and the actuating means, including sensing the current state of the fastening element (engaged or disengaged), sensing to allow optimised control of the application of energy to the actuation means and sensing in order to report performance, degradation or impending failure of the fastening element or actuation means.

A sensor may operate in a number of ways, such as by use of one or more limit switches which may employ electrical contact, magnetic, optical, capacitive or any other suitable sensing mechanism, to sense the current fastener condition (i.e., open, closed, intermediate or any one of a number of stable positions). Another example is one or more strain gauges or equivalent strain sensing devices which are installed on or in association with the fastener to sense position and condition and, having high levels of resolution, which can allow fine position determination and control. As another example, force sensors or force sensing devices may be installed on or associated with the fastener, in order to sense the force exerted on or by the fastener, and the condition of the fastener, with high levels of resolution and once again allowing fine position determination and control. Proximity sensors or equivalent positioning sensing devices may be used to sense the position of the fastener. Temperature sensors or equivalent temperature sensing devices can be used to sense the temperature of the fastener and, depending on the fastener type, these may be used to optimise control of the fastener and to sense condition of the fastener. Other examples of sensors will be apparent to one skilled in the art.

As well as enabling reports as to fastener position and condition to other areas of a network system, sensors may be used to optimise fastener control operations. Non-limiting examples are as follows.

In a first example, sensors in the form of limit switches are used to sense movement of the beam to the disengagement position. Power is supplied at a high level to the actuating means until the disengagement position is reached, whereupon the limit switches report this position. At that stage, power can be reduced to a lower level, being still sufficient to sustain the fastener in the disengagement position. Operating time, energy consumption and heating is minimised.

In a second example, a strain gauge is attached to the beam. Power can be applied at a high level to the actuating means until the beam is deflected to the disengagement position. Detection of this position by the strain gauge enables the power to be reduced to a lower level, once again being sufficient to sustain the fastener in the disengaged position, but at the same time minimising operating time, energy consumption and heating. In addition, analysis of the degree of bending of the beam as a function of applied power and time will allow degradation of the beam to be detected and signal the need for replacement prior to complete failure.

As a variation on the second example, there may be two strain gauges on the beam, one on either side. Differential measurement allows the beam position to be determined throughout its travel, with high resolution. Common mode measurement can allow linear extension or compression of the beam to be measured and hence axial loading on the beam to be determined.

As a third example, sensors may sense the contents (or lack of contents) of fastened elements and provide an appropriate response. For example, if the elements joined by the fastener are pipes, a sensor may sense presence of fluid in the pipe and refuse to disengage the pipes, even if given a command to do so. Similarly, the sensor may sense electrical current in a cable joined by the fasteners and refuse to disengage if to do so would cause a dangerous situation.

In a further example, the sensor may be a local temperature probe, which can sense ambient temperature and report to an embedded processor. The processor could then calculate and distribute the appropriate amount of power required to activate the actuating means. Shape memory alloy is usually activated by a pulse of power, for example, a 150° C. pulse of power. This works well if the ambient temperature is in the range of −50° C. to 75° C. However, if the ambient temperature is high, such as over 75° C., the 150° C. pulse of power may cause the shape memory wire to overheat. Consequently, the sensor, having sensed the ambient temperature, can enable the processor to work out and distribute the appropriate amount of power to the fastener, increase the operating temperature window of the system at lower ambient temperatures, or save power if the ambient temperature is already relatively high.

Second Aspect

In a second aspect, the invention provides a fastener for use in a network of fasteners, the fastener including an address means to distinguish the fastener from the other fasteners in the network. The second aspect of the invention also provides a network of such fasteners, also referred to below as a "system".

In a further aspect, the network of fasteners has one or more of the following characteristics:

(a) the fasteners are distributed throughout an assembly in an ordered pattern;
(b) the fasteners are distributed throughout an assembly to form a three dimensional network.

The fastener may be the fastener according to the first aspect of the invention or any other suitable fastener. One example is the bolt assembly forming subject of International Patent Application No. PCT/AU03/001539. Another example is the fastener forming subject of International Patent Application No. PCT/AU2004/000371. The contents of both specifications are imported herein by reference.

The address means is intended to enable a network system to identify the fastener, for the purpose of establishing communications and addressing commands, such as a command to cause activation of actuating means.

The fastener may have actuating means which is any suitable actuating means and which will depend to a large extent on the nature of the fastener. Examples of actuating means are as follows: magnetic (linear solenoid), magnetic (rotary solenoid), magnetic (linear actuator), magnetic (motor), piezoelectric, electrostatic, thermal (shape memory alloy), thermal (bimetallic), thermal (state change), pneumatic, hydraulic, chemical, pyrotechnic or explosive, acoustic or ultrasonic, ionising radiation, ionising particles, luminescent and gravitational.

The address means may be any suitable means but preferably is capable of storage in a non-volatile manner, in order to resist corruption and intentional or unintentional over-writing or reprogramming. It is also preferred that the address means does not enable more than one fastener to have the same identity, unless there is requirement for a replacement fastener to assume the same identity as the original fastener being replaced.

By way of non-limiting example, the address means may comprise a serial number, a communications address or a temporary communications address, or any combination of these.

When the address means is a serial number, this is preferably a unique number which is programmed into the fastener as part of the manufacturing process and which consequently does not change throughout the life of the fastener.

When the address means is a communications address, this is preferably a communications or network address which may be assigned to the fastener at the time of installation, or when the network is configured.

When the address means is a temporary communications address, this is an address which may be assigned to the fastener on a transient basis. This may be desired, for example, where the fastener is configured in a sub-network and use of the full, unique address of the fastener during a particular session will cause excessive communications traffic and/or require excessive processing overhead during the communication session.

The address means may enable the unique identity of the fastener to be stored in any suitable way, and in any suitable storage device. Preferably, the storage method is robust and uses known techniques, such as multiple redundant storage with checksum or CRC protection, reinstatement of backups on detection of errors, etc. Preferably, the storage method includes measures to prevent unauthorised access or tampering with the unique identity.

Examples of storage devices are following:

Hardwiring: this includes switches, jumpers, solder blobs and soldered links.

Non-volatile memory: this includes PROM (programmable read only memory), EPROM (erasable programmable read only memory), EEPROM (electrically erasable programmable read only memory), Flash memory, battery backed random access memory (RAM), ferromagnetic RAM and optical storage. Storage of the unique identity may be combined with the operating program code of a microcontroller.

Semiconductor: storage in this form can incorporate the unique serial number programmed during manufacture and capable of being read by a microcontroller.

The address or identity of the fastener may be encrypted. There are many forms of available encryption techniques which may be suitable to the present invention. By way of example, the following are mentioned.

The first example is link encryption, where each communications link in which the information may be intercepted is protected by encryption of information on that link. Information may appear unencrypted or "in the clear" at communications or control nodes, and may need to be protected by other means, such as physical access control—discussed further below—at those points.

The second example is end-to-end encryption, in which information is encrypted at its source and decrypted at its destination and does not appear "in the clear" at intermediate points in the communications links.

As a third example, both end-to-end encryption as well as transmission over individually encrypted links may be used to result in a hybrid system.

In relation to physical access control, it may be desirable to incorporate further security measures to prevent unauthorised access to a system or network of fasteners of the invention, especially where there is a high level of need to prevent any unauthorised party to control fasteners, change system settings or configurations or cause damage or disruption to the system for any reason. By way of example, fasteners may attach valuable items to a vehicle or attach a door to its surround so as to lock the door. Obviously in such circumstances unauthorised operation of the fasteners could allow theft of the valuable items or intrusion through the door to occur.

While file encryption is one way to prevent unauthorised entry into a fastener system, there are other ways of controlling access. Some non-limiting examples are set out below.

Physical access to a system and its elements may be prevented by physically isolating the system or making it difficult to locate. For example, wiring for the system can be disguised within the loom of a vehicle. As another example, spread spectrum wireless communication techniques can be used to hide radiated signals amongst radio noise. Use of spread spectrum wireless links or other communications methods, such as optical fibres, can make it difficult to intercept, modify, disrupt or jam commands or communications to the system.

By way of further example, secure methods of identification may be used. For example, biometric information techniques may be used to identify authorised personnel and/or systems. Electronic security certificates may be required to authorise access by computer based systems. Valid access may require confirmation by personnel or systems by a bi-directional handshake and identity confirmation process, or by such measures as call-back to an authorised telephone number or a network address, for example.

By way of further example, access to and control of fasteners may require the operator or control system to take part in a dialogue with a master control/database for a specific access code, in order to allow control of the fastener. As well as such explicit authorisation, there may be tracking of the transaction. For example, the access code and fastener operation may be recorded in a time stamped log stored by the master control/database, by the fastener itself or by intermediate system elements. Retrieval of such logs can permit analysis for audit tracking purposes.

In the system of the invention, each activating means may actuate one or more fastening elements. The system preferably includes a control means for controlling actuation of the actuating means, typically by energy from an energy source. Each control means may control one or more of the actuation means.

It is further preferred that the system of the invention includes an intelligent controller device for controlling the control means, and, through it, the actuating means, typically in response to an external stimulus. Each intelligent controller device may control one or more control means.

Also, in this system of the invention, it is preferred that there is an energy source for providing energy to the actuating means. The energy source may include local storage of energy, such as in a battery, or externally applied energy, or a combination of both.

The system may include a sensor, which has already been discussed above and which also applies to the second and further aspects of the invention. The system may further include an external sensing means for determining and reporting the condition of external elements, for example, relating to an element which is engaged by the fastener and the engagement condition.

The system may include status indication means (such as an LED or an audible signal), to indicate the current condition of the fastener or the external sensing means and/or any other aspect of the system.

Further, the system may include communication means for enabling an external device or system to communicate with the fasteners of the invention in the system, both for control and for status reporting functions.

In one preferred embodiment, the system of the invention includes one or more fasteners of the invention together with one or more control means, one or more sensors, an energy source, an intelligent control device, a status indicator and an external sensing means.

In an expanded form of the system, a plurality of fastener systems as per the last mentioned preferred embodiment is networked with one or more optional communications concentrators, one or more intelligent control units and one or more master control/database units. Examples of these are given below in connection with the drawings.

It will be appreciated that the invention in its various aspects set out above has particular application areas for product assembly, product disassembly, product recycling, product servicing and maintenance.

In relation to product assembly, disassembly and product recycling, application of the invention in its various aspects is most useful for products which already incorporate electronics, such as mobile phones, computers, LCD screens, televisions, white goods, and audio equipment. The invention is also useful in relation to automobiles, for example in connection with exterior trims and accessories, interior trims, air conditioning units, sound systems and auto-electrical subassemblies.

In relation to product servicing and maintenance, the fasteners of the invention can provide faster and more secure (because authorised) access to parts and subassemblies of products or equipment for the purposes of repair, replacement or maintenance. The fasteners can provide a significant saving in labour, since they can reduce the average time for repair. They can also provide a cost effective and secure method of access to internal components.

The fasteners can reduce the need for skill, because the process of assembly and disassembly can be directed by a computer.

Areas of application for product servicing and maintenance include those of computer components—for example, fastening a CD drive or a mother board to a housing; printer cartridges; retaining batteries—for example, on a power drill; automobile parts—for example, radio, air conditioning, interior panels, fuel cap release; and access panels on machinery and other equipment, such as forklifts.

Further application may be for access to "public equipment". This has already been discussed and examples given of access panels in buildings, covers for lights, signage systems, etc.

The fasteners of the invention may also provide relatively inexpensive electronic locks. The fasteners can be manufactured at a very low cost compared to solenoids or other conventional means of electronic locking. As a result, it may now be feasible to provide electronic locking, whereas, before now, cost would have been a prohibiting factor. Examples are: mailboxes, windows, cabinets, medicine cabinets and tool boxes. It will be recalled that the use of fasteners of the invention for electronic locking with such products can also provide for additional benefits of an intelligent system, which can report on history of access and activation by environment and which can also allow for encryption.

The fasteners may be networked in any way as disclosed above or in any other suitable way. For example, the fasteners may be networked by hard wiring or by, for example, "blue tooth" communication or by other wireless means.

The fasteners may communicate with each other and/or with a central monitor, such as a computer, in any one or more of the following ways: by cable, by wireless link, by custom radio link, "Blue Tooth", "Zigbee", "Wifi" (802.11), inductive coupling, infra-red, microwave, visible light or using ultra-sound or other acoustic energy. Wireless link may be via an external system, which then communicates with the fasteners in the network, for example by global positioning system (GPS), by SMS or MMS, by GPRS or by Wifi to an internet access point.

The foregoing examples are not limiting with respect to the invention.

Preferably, the network of fasteners is distributed throughout the assembly so as to provide, essentially, a three dimensional model of the assembly.

The assembly can be chosen from a wide range of objects. For example, the assembly may be a building, a motor vehicle, an aircraft or any of a myriad of other objects.

Whether the fasteners are distributed throughout the assembly in an ordered pattern or to form a three dimensional network, it is not essential that every fastener in the network is multi-functional. However, it is preferred that every fastener is multi-functional.

The invention may be particularly useful in providing to a central monitoring point an environmental picture of all or most of the assembly at the location of each fastener. For example, a fastener or a group of fasteners may sense ambient temperature and compare this to the temperature sensed by another fastener or group of fasteners. The comparison may activate some of the fasteners. For instance, if the assembly is a building and a temperature differential is detected by comparison of the temperature reports from various fasteners or groups of fasteners, air conditioning may be activated, or one or more windows in the building may be opened or closed, or both air conditioning and windows may be activated. This can provide automatic temperature control. The fasteners may take part in the activation, for example, by releasing a window biased to the open position. Alternately, the fasteners may report to an activating mechanism which then carries out the required task.

The network of fasteners may pass on other sensed data, for example to a computer which analyses and displays the real time situation against the ideal state. For example, the assembly may be a building and the network of fasteners may be used to adjust the lighting levels in response to natural light availability. As another example, the fasteners in the building may detect fire at an early stage, by sensing an unacceptable rise in temperature (and activate an alarm or water sprinklers, for example). The fasteners may report overstressing or damage to a fastener in the system and control the situation by increasing the level of fastening of adjacent fasteners or by activating a redundant fastener. The network of fasteners may function to release a particular part of the assembly in an emergency. For example, in case of fire or explosion, the network may instruct certain fasteners to release part of the assembly such as a beam or a door if this is calculated to reduce the seriousness of the outcome of the fire or explosion.

The fasteners may have a single function in addition to the fastening function, or some or all of the fasteners may have more than one additional function. For example, a fastener may be both heat sensitive and light sensitive as well as having its primary fastening function.

It will be apparent to one skilled in the art that the invention has an extremely wide range of application. Some further examples are referred to below. It is to be understood that these are not limiting on the scope of the invention.

The assembly may be the hull of an oil tanker. The network of fasteners may be adapted to detect breach to the hull and generate an alarm.

The network of fasteners may be built into the frame of an aircraft and sensitive to changes in temperature, thus being able to detect, at an extremely early stage, that a fire has started, for example in an electrical system. The generation of an alarm at this early stage can enable swift action to prevent major damage.

The network of fasteners may be built into the body of a military vehicle and be adapted to detect the presence of chemicals or adverse biological conditions, and cause action to be taken to ensure the safety of the occupants or generate an alarm.

Especially in the case of the fasteners disclosed in the first aspect above, the sensors may be incorporated in the fasteners in a very economical manner. There can be virtually no extra costs in including a suitable sensor in the electronic chip controlling the fastener.

As indicated above, the response of the fastener to the sensor may be to release or fasten, or may be to generate some other type of response, such as an alarm or activate another mechanism.

Third Aspect

Reference has been made above to assembly line procedures. It will appreciated by one skilled in the art that the present invention is capable of overcoming bottleneck problems which can reduce the speed of assembly or, in severe cases, hold up the assembly line. The present invention provides a system for controlling a process of assembly for producing products and this forms an aspect of the present invention.

Accordingly, this invention provides, in a process for producing product, the process including a plurality of steps in which a first element is releasably fixed to a second element, the use of the fastener of the present invention to releasably fix the first element and the second element. In the method of the invention, it is preferred that most, if not all, of the fixing is carried out by means of the fasteners of the invention.

The invention also provides a computer system programmed to perform the process of the invention. As indicated above, the computer system can include hardware and/or software. The hardware can be designed to be plugged in to a suitable port in the assembly, or parts of it. Alternately, the hardware may be designed to transmit data in a wireless manner, as is known in the art.

The software preferably includes input data relevant to the location and function of each programmable fastener and interrelationship of the fasteners with each other, as well as means for enabling the computation of the most efficient manner of release of the fasteners to achieve a purpose. The system also preferably includes output means to guide, question or instruct a user in order to achieve the desired purpose. The system also preferably includes means for activating the relevant fastener of the invention.

It will be appreciated that the system of the invention requires the software to be able to interact with the relevant fastener and optionally cause activation of the fastener. Optionally, the system of the invention can first diagnose a problem and report on it.

BRIEF DESCRIPTION OF THE DRAWINGS

The invention in its various aspects will now be described in connection with certain non-limiting examples described in the attached drawings. In the drawings:

FIGS. 9 to 12 show a fourth embodiment;

FIGS. 13 to 15 show a fifth embodiment;

FIGS. 25 to 27 show an eighth embodiment;

FIGS. 30 to 34 show the ninth embodiment of FIGS. 28 and 29 in situ;

FIGS. 39 and 40 show an eleventh embodiment;

FIGS. 41 to 43 show a twelfth embodiment;

FIGS. 56 to 61 show a different embodiment of the fastener of the invention used for door locking;

FIGS. 62 and 63 show an embodiment of the fastener in connection with limit switches;

FIGS. 64 and 65 show an embodiment of the fastener with a strain gauge;

FIGS. 66 and 67 show an embodiment similar to that in FIGS. 64 and 65 but with two strain gauges.

DETAILED DESCRIPTION OF THE DRAWING

Figures 1, 2, 3:
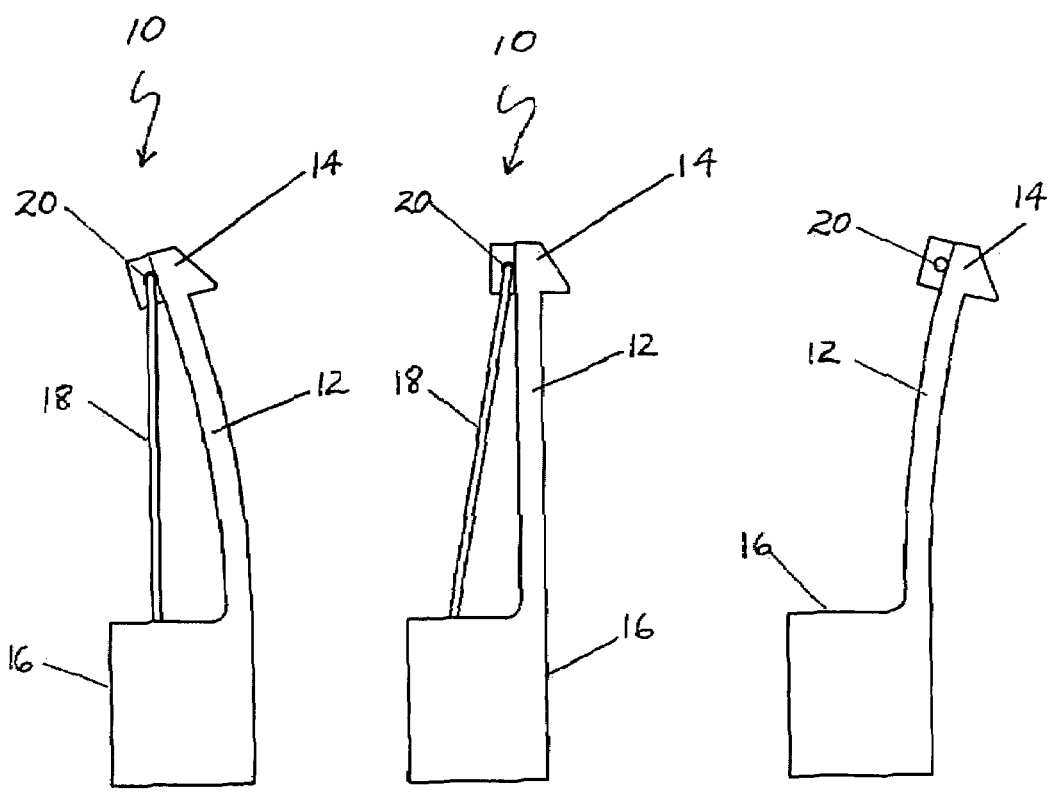
FIGS. 1 and 2 show in side view a simple form of a first embodiment of the first aspect of the fastener of the invention.
FIG. 3 shows part of the fastener of FIGS. 1 and 2.

Referring first to FIGS. 1 to 3, this embodiment is made of moulded plastic and the actuating means is a smart memory alloy wire. The fastener 10 is shown in side elevation and has, formed integrally, flexible beam 12 having at one end engagement means 14 and at the other mounting block 16. Shape memory alloy wire 18 forms a loop passing through channel 20, with both ends of the loop secured in block 16. This fastener is provided in a pre-cambered form, as illustrated in FIG. 3. When wire 18 is attached, the correct tension is provided to wire 18, as shown in FIG. 2, where fastener 10 is in the engaged position. FIG. 1 shows the disengaged position, after wire 18 has contracted. This embodiment could also be made from moulded metal.

Figures 4, 5:
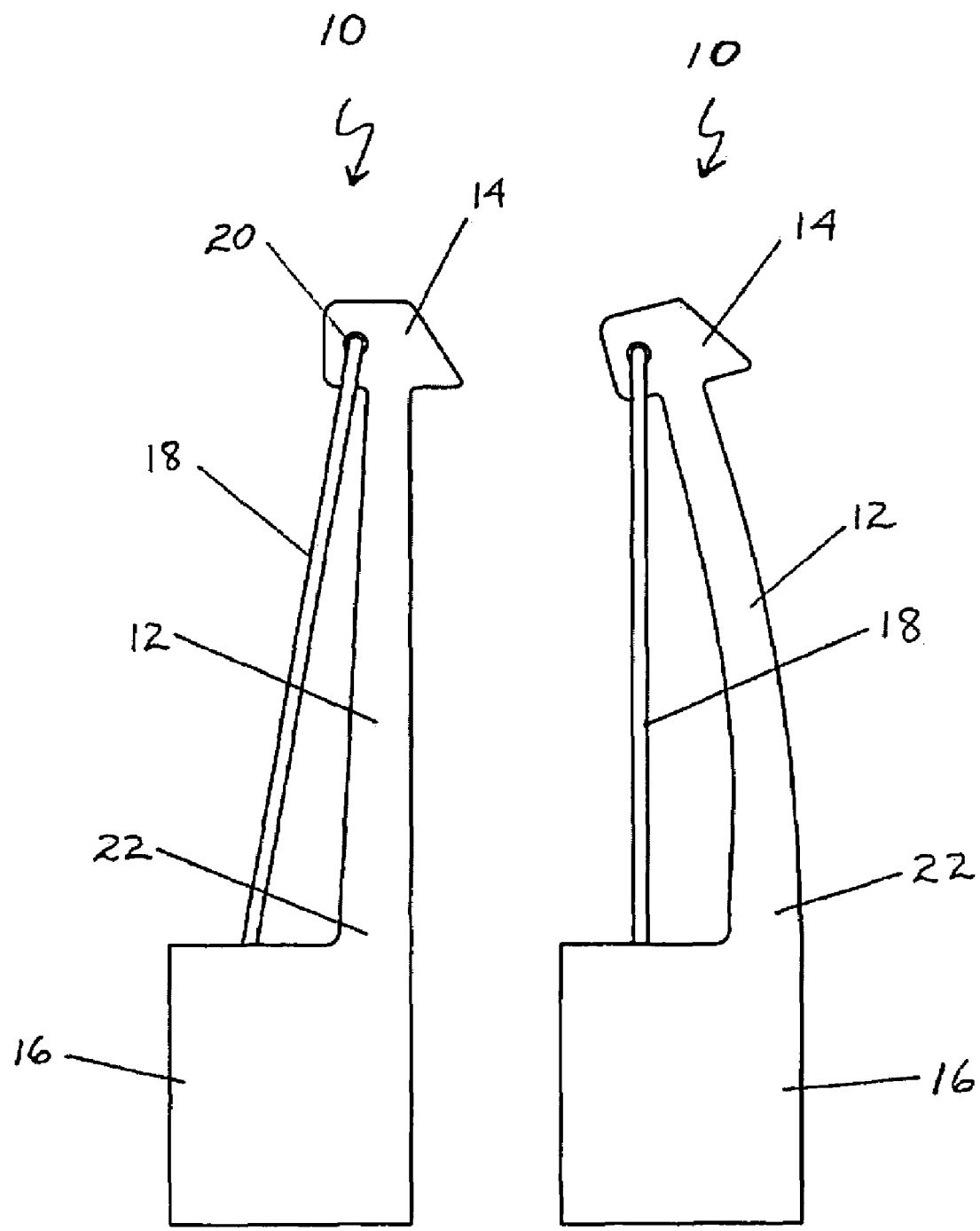
FIGS. 4 and 5 show a second embodiment of the first aspect of the fastener of the invention.

Turning now to FIGS. 4 and 5, this second embodiment, which also shows the fastener in side elevation, is similar to the first embodiment and the same numbers are used. The difference between the respective embodiments is the thickening of beam 12 at 22 where beam 12 joins block 16. The purpose of this thickening is to strengthen beam 12 to improve the structural and long-term integrity of the fastener.

Figure 6:
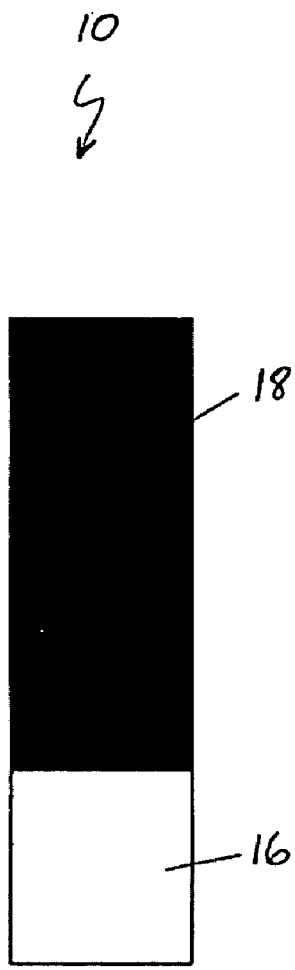
FIGS. 6 to 8 show a third embodiment.
Figure 7:
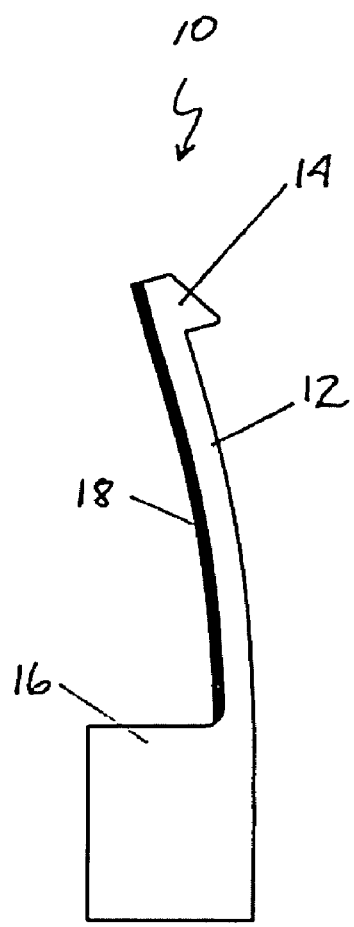
Figure 8:
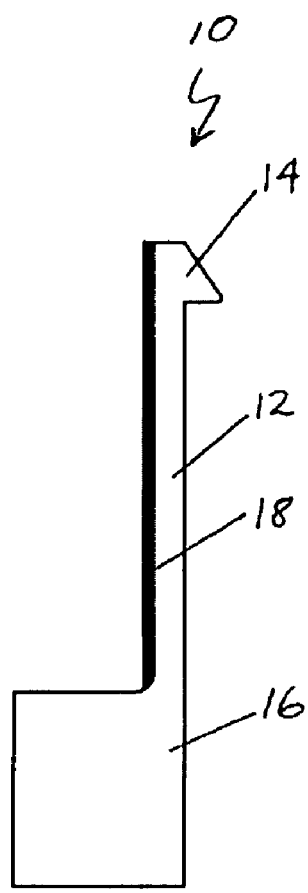

A third embodiment is shown in FIGS. 6 to 8. FIGS. 7 and 8 show the fastener in side elevation while FIG. 6 is a rear elevation. The same numbers are used for parts having the same function. Fastener 10 includes flexible beam 12 and engagement means 14. However, the actuating means 18, instead of comprising shape memory alloy wire as in the previous embodiments, consists of shape memory alloy coating 18 running along the rear of beam 12.

Fastener 10 is shown in the engagement position in FIG. 8 and in the disengagement position in FIG. 7, after contraction of shape memory alloy coating 18.

The embodiment in FIGS. 9 to 12 differs from those in FIGS. 1 to 3 and 4 to 5 in the manner of attachment of the actuating means. FIG. 9 is a rear view, FIG. 10 a side elevation, FIG. 11 a front view and FIG. 12 a top view of fastener 10.

In this embodiment, fastener 10 has flexible beam 12 integral with engagement means 14 and mounting block 16. In contrast to the first embodiment, flexible beam 12 is located at the rear of mounting block 16, rather than at the front as in FIGS. 1 to 3. Shape memory alloy wire 18, made of titanium/nickel, passes through channel 20 in the same way as in the first embodiment. However, wire 18 is held on block 16 by wire attachment screws 24. Power is fed to wire 18 through power cables 26 which emerge from the front of block 16 as shown in FIGS. 10 and 12. For convenience, power cables 26 have been omitted from the front view in FIG. 11.

The embodiment in FIGS. 13 to 15 mainly differs from the previous embodiments in that, instead of mounting block 16, it has a clip style base 28 with flexible locking members 30, designed to snap into a part (not shown). In addition, flexible beam 12 is located approximately in the centre of clip style base 28. Shape memory alloy wire 18 is secured in base 28.

Figure 18:
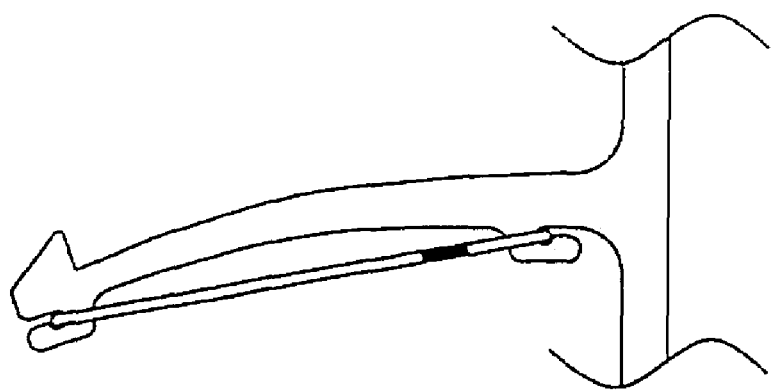
FIGS. 16 to 18 show a sixth embodiment.
Figure 17:
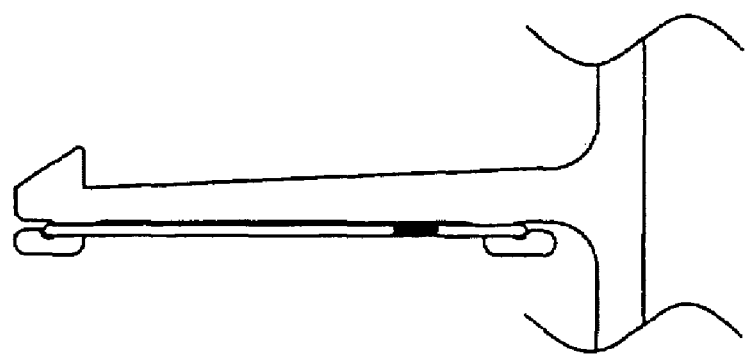
Figure 16:
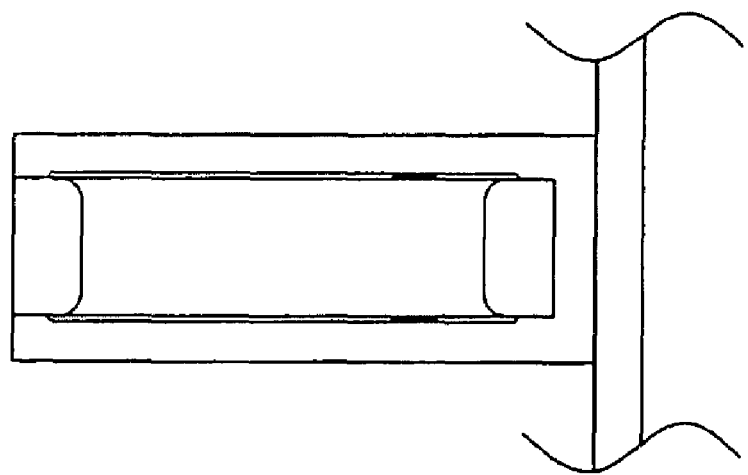

The embodiment in FIGS. 16 to 18 is moulded integrally with an element for which it is providing the attachment. The element, which is partly shown at 32, may be, for example, part of a plastic casing to hold a mobile phone.

Flexible beam 12 is integral element 32 and can include two hooks 34. Hooks 34 secure shape memory alloy wire 18, which is crimped at 36, to insulating wire, such as nylon wire, 38. FIG. 16 shows fastener 10 in rear view, while FIG. 17 is a side view in the engagement position and FIG. 18 is a side view in the disengagement position.

Figure 21:
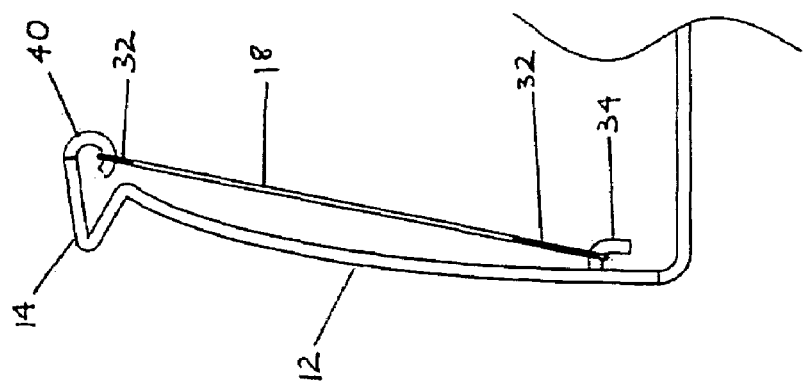
FIGS. 19 to 21 show a seventh embodiment.
Figure 20:
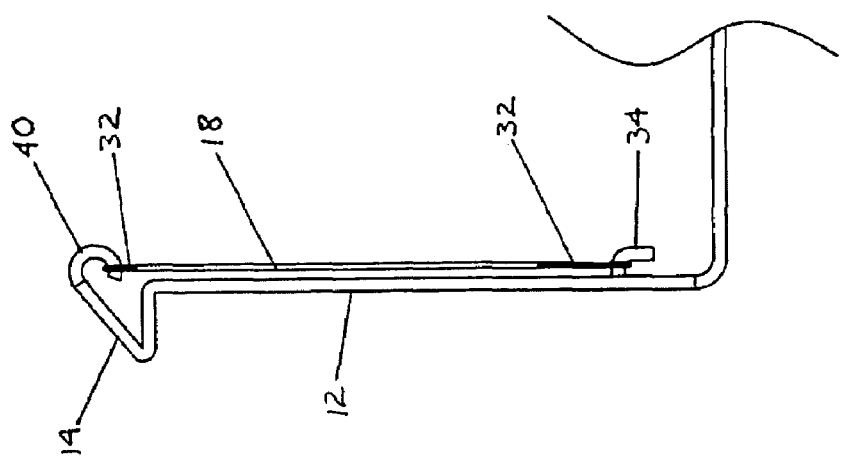
Figure 19:
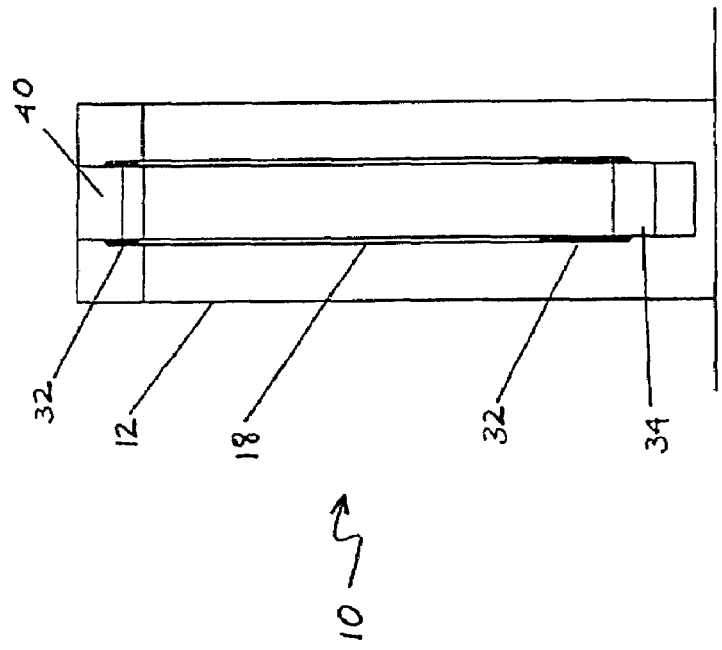

Turning now to FIGS. 19 to 21, FIG. 19 is a rear view and FIGS. 20 and 21 are side views of the fastener in this embodiment. Fastener 10 has been integrally formed from sheet metal, as will be explained in relation to FIGS. 22 to 24. Fastener 10 has beam 12, at one end of which is located engagement means 14. At the rear of engagement means 14 is hook 40. Shape memory alloy wire 18 extends from hook 40 to lower hook 34, being suitably insulated at 32. As can be seen from FIG. 19, wire 18 forms a loop around hook 40 and 34.

When wire 18 is caused to contract by an electric current (electrical connection not shown), it contracts to bend beam 12 from the engaged position shown in FIG. 20 to the disengaged position shown in FIG. 21.

Figure 22:
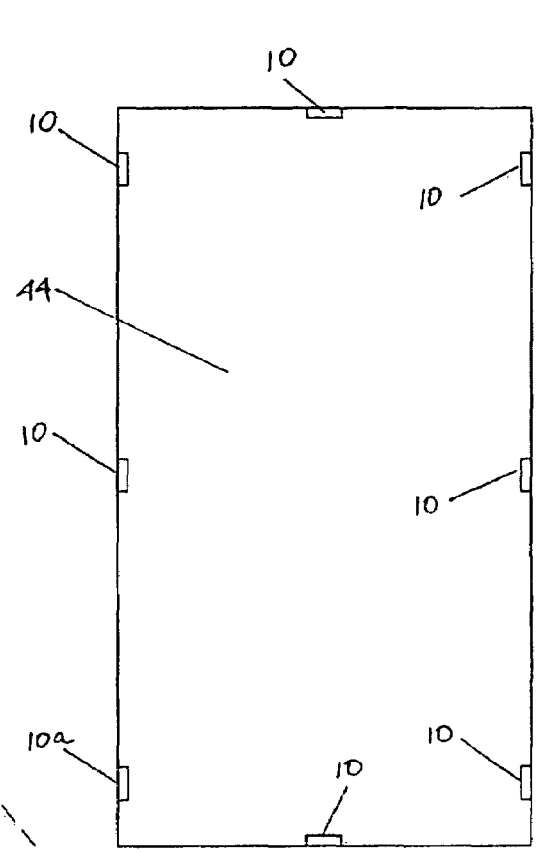
FIGS. 22 to 24 show the embodiment of FIGS. 19 to 21 formed from an element.
Figure 23:
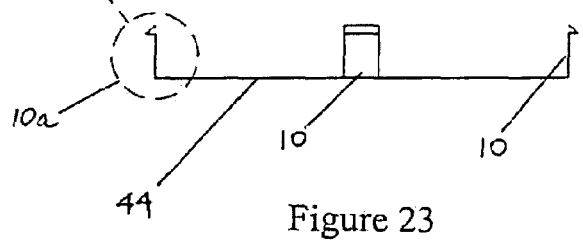

FIG. 22 is a plan view and FIG. 23 a diagrammatic end view of a sheet of metal with which fastener 10 is formed, for example, by stamping. As can be seen from FIG. 22 and as partially shown in FIG. 23, there are several fasteners 10 formed in conjunction with sheet 44 and spaced at intervals to enhance fastening efficiency.

Figure 24:
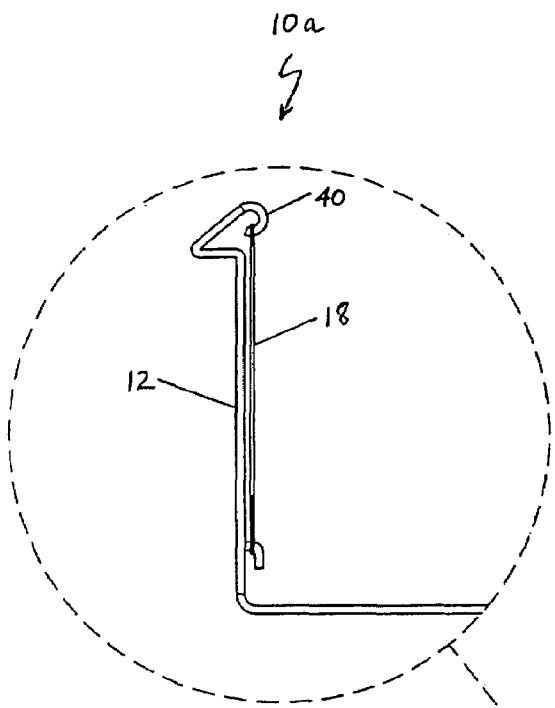

FIG. 24 is an enlarged view of the fastener 10a shown in FIG. 23.

The embodiment in FIGS. 25 to 27 is a bistable fastener, 50. FIG. 25 is a rear view, FIG. 26 is a side elevation in the engaged position and FIG. 27 is a side elevation in the disengaged position. Like the embodiment in FIGS. 19 to 21, fastener 50 is formed from sheet metal.

In this embodiment, flexible beam 12 includes integral spring clip 36.

Fastener 50 is bistable with the beam having two stable positions. It has two smart memory alloy wires, 18a and 18b. Wire 18a, which is shown in the contracted form in FIG. 26, moves fastener 50 in the engaged position. Wire 18b, which is shown in the contracted form in FIG. 27, moves fastener 50 in the disengaged position. When power is applied to wire 18a, fastener 50 will be engaged. When power is applied to wire 18b, fastener 50 will disengage.

The embodiment in FIGS. 28 to 34 is a wedge-style fastener 52. Whereas the embodiment in FIGS. 1 to 3, for example, had a projecting engagement means 14, the embodiment in FIGS. 28 to 34 engages through co-operation of the wedge shape of the flexible beam with catches shown in FIGS. 30 and 31.

In this embodiment, fastener 52 has flexible beam 48 which tapers from a wide part 54 to base 56. The shape of the taper between wide part 54 and base 56 is complemented by the shape of catches 58, as can be seen by FIG. 30.

Figure 28:
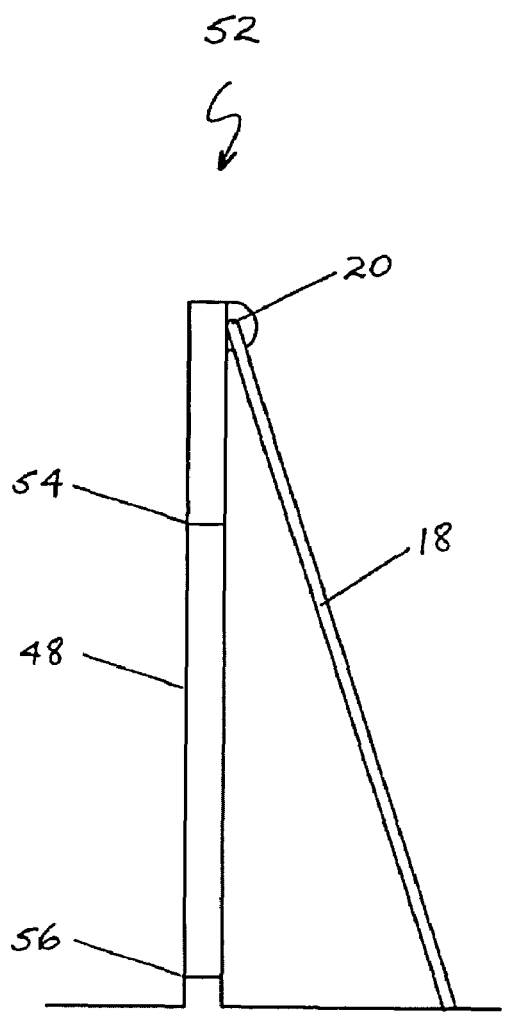
FIGS. 28 and 29 show a ninth embodiment.
Figure 29:
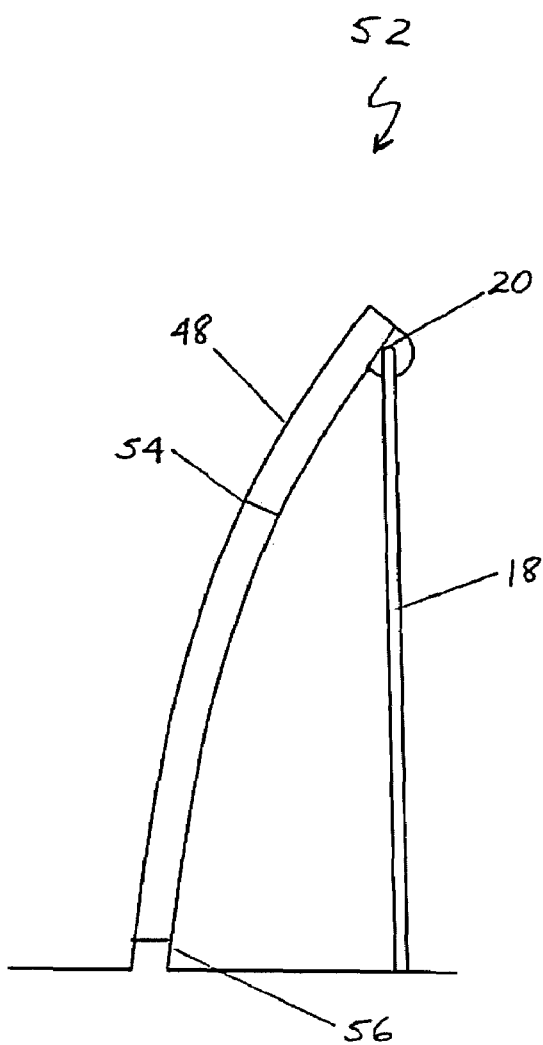

FIG. 28 shows fastener 52 in the locked position in side elevation, while FIG. 29 is a side elevation showing the unlocked position. FIG. 30 is a rear view of fastener 52 engaged with an element 60, fastener 52 being integral or attached to element 62. FIG. 31 shows element 60 without fastener 52 in position and FIG. 32 shows fastener 52 attached to element 62, without element 60. FIG. 33 is a sectional view taken along the lines A-A in FIG. 31. FIG. 34 is a sectional view taken along the lines B-B in FIG. 31.

In the engaged position as shown in FIG. 28, fastener 52 holds element 62 in engagement with element 60, by engagement of fastener 52 with catches 58. As shown in FIG. 29, contraction of shape memory alloy wire 18 draws flexible beam 48 out of engagement with catches 58, thus enabling separation of elements 60 and 62.

Figure 35:
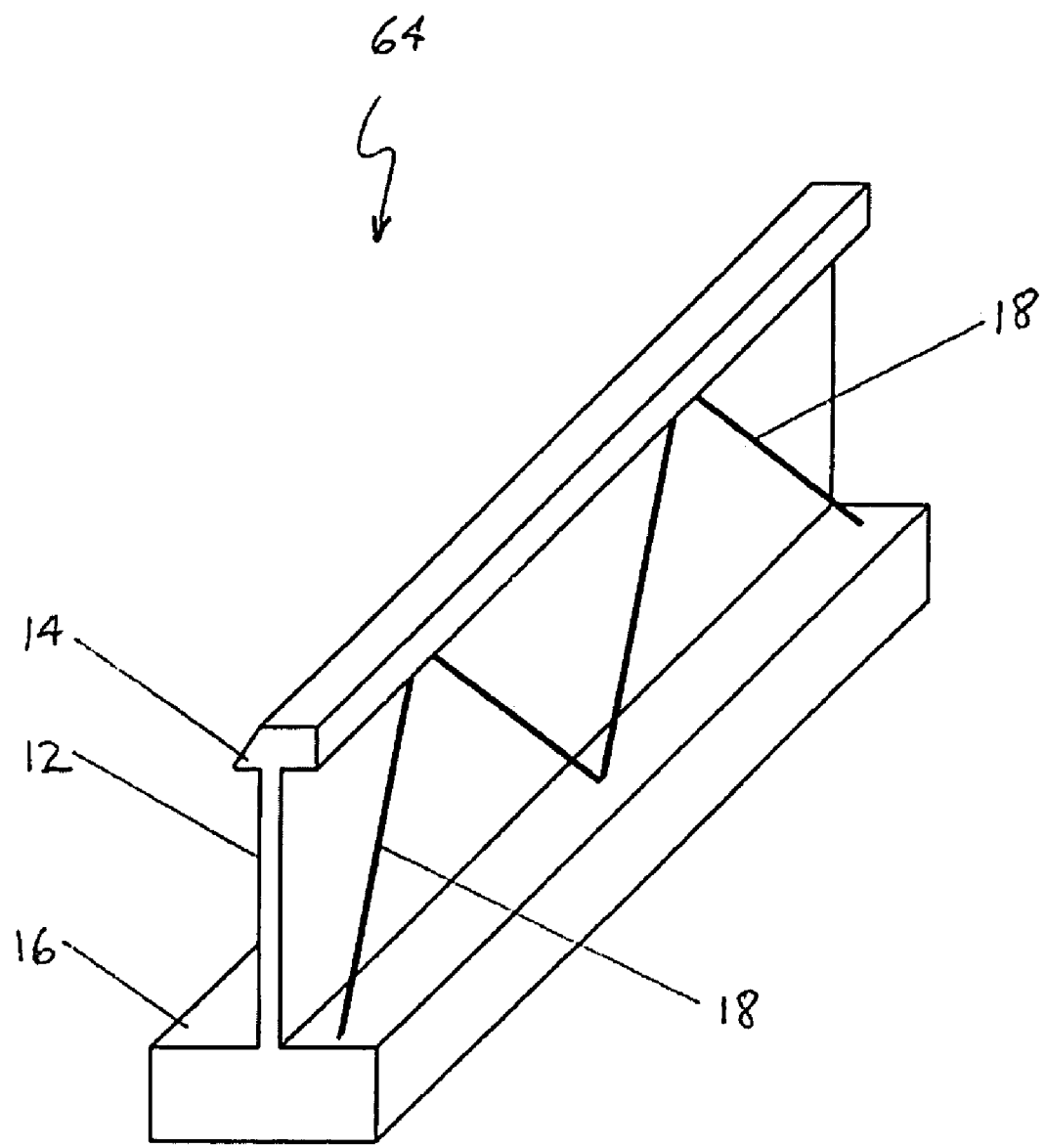
FIG. 35 shows a linear form of an embodiment similar to that in FIGS. 1 to 3.

Fastener 64 in FIG. 35 is a linearly extending fastener, in contrast to the discrete fasteners in the previous embodiments. Fastener 64 includes flexible beam 12 and engagement means 14, flexible beam 12 being integral with mounting block 16 which in this embodiment both form a strip. Fastener 64 may be any desired length. Shape-memory alloy wire 18 is lashed along the length of fastener 64. Fastener 64 is especially suitable for providing a continuous fastener for a door or window, for example.

Figure 36:
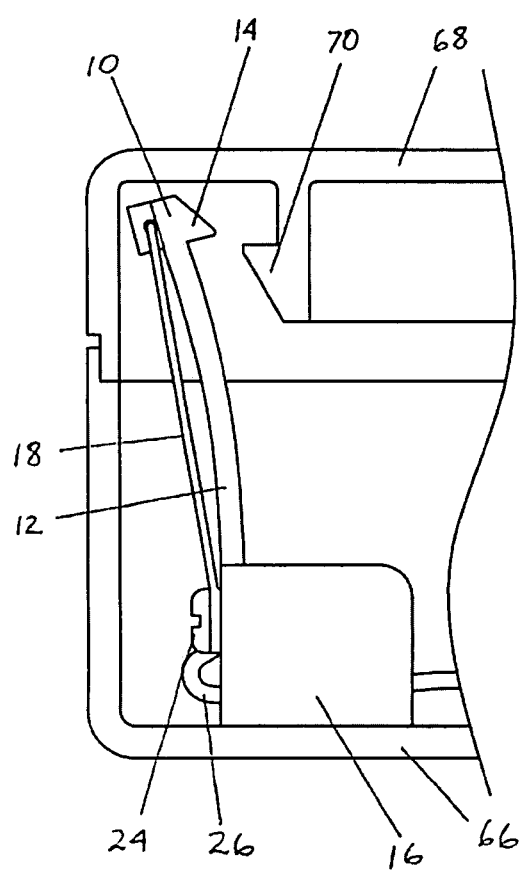
FIGS. 36 and 37 show the embodiment in FIGS. 9 to 12 in situ.
Figure 37:
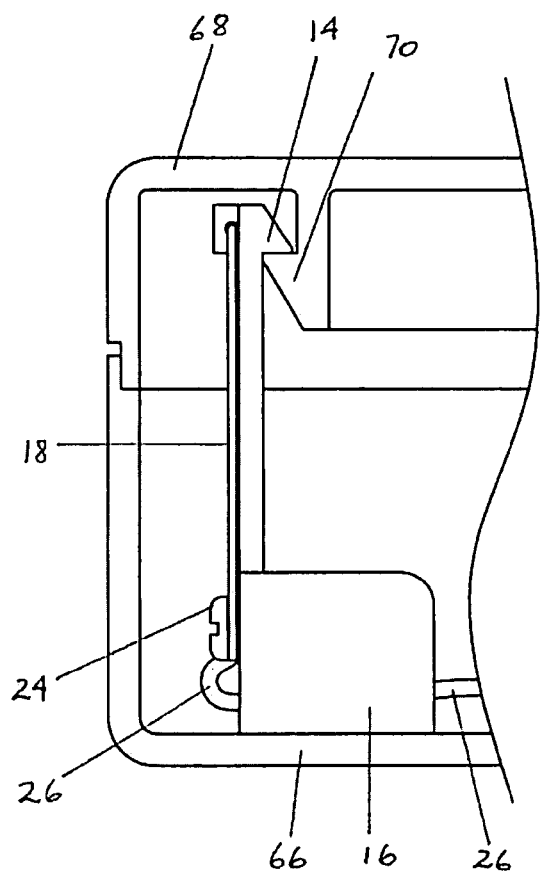

Referring now to FIGS. 36 and 37, these show fastener 10 of FIGS. 9 to 12 inside a product. Fastener 10 is shown attached to element 66, being the base of a product case. Fastener 10 is attached by adhesive to base 66. The product case includes lid 68 (the second element) which has integral with it a wedge-shaped catch 70.

As shown in FIG. 37, when smart memory alloy wire 18 is in the relaxed state, engagement means 14 hooks onto catch 70 and holds lid 68 in engagement with base 66. When wire 18 is heated sufficiently by electrical current running through power cables 26, wire 18 contracts and withdraws engagement means 14 from catch 70, as shown in FIG. 36. Thus lid 68 is released from base 66.

Figure 38:
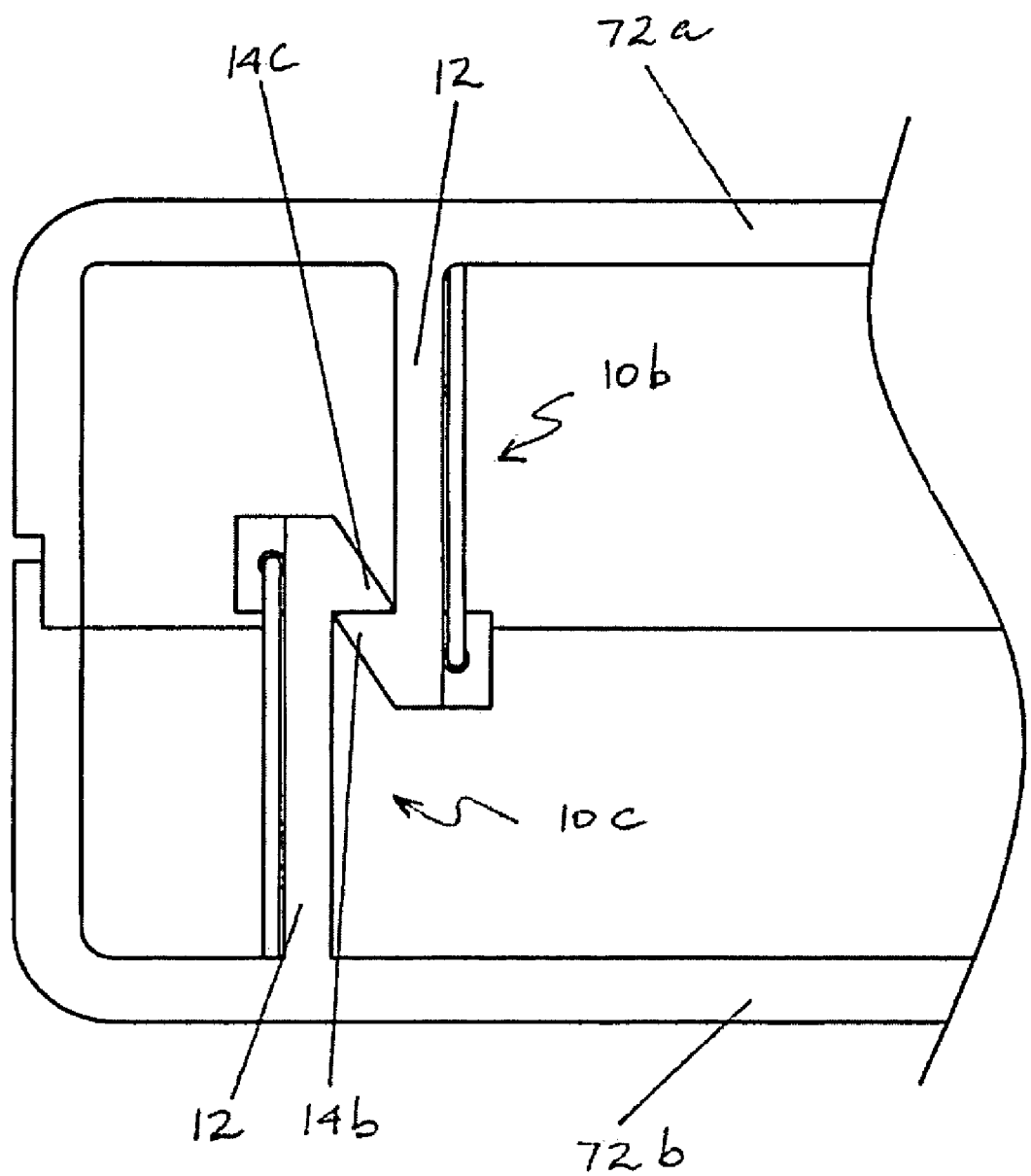
FIG. 38 shows a tenth embodiment.

FIG. 38 shows a tenth embodiment, in which two fasteners 10 are designed to engage each other. Each fastener 78 is formed integrally with part of a product casing. Fastener 10*b* is moulded integrally with casing part 72*a*, while fastener 10*c* is moulded integrally with casing part 72*b*. In order to disengage the engagement means 14*b* and 14*c*, each fastener needs to deflect only half as much as normal and therefore flexible beams 12 can be made stiffer.

The embodiment in FIGS. 39 and 40 has a flexible beam 12 with two engagement means 14*d* and 14*e*. As shown, fastener 78 is used to hold together two panels, 74 and 76. Fastener 78 is preferably made in strip form so that it extends for substantially the length of panels 74 and 77. Flange 80 serves to disguise the joins between panels 74 and 76.

FIG. 39 shows fastener 78 in the engaged position, while FIG. 40 shows fastener 78 in the disengaged position, after shape memory alloy wire 18 has been heated sufficiently to contract. Channels 82, into which engagement means 14D and 14E fit in the locked position, can be best seen in FIG. 40.

Turning now to FIGS. 41 to 43, FIG. 41 is a rear view and FIGS. 42 and 43 side elevations of this embodiment, which shows the shape memory wire encapsulated in rubber. Fastener 10 has beam 12 integral with mounting block 16. Power cable 26 is in communication with shape memory alloy wire 18. Shape memory wire 18 and the rear of beam 12 is covered in rubber 84. The rubber covering 84 protects shape memory wire 18 from the environment. It also works as a heat sink to cool wire 18 more quickly. In addition, rubber 84 provides a restoration force to beam 12, helping to prevent "creep".

Figures 44, 45, 46, 47:
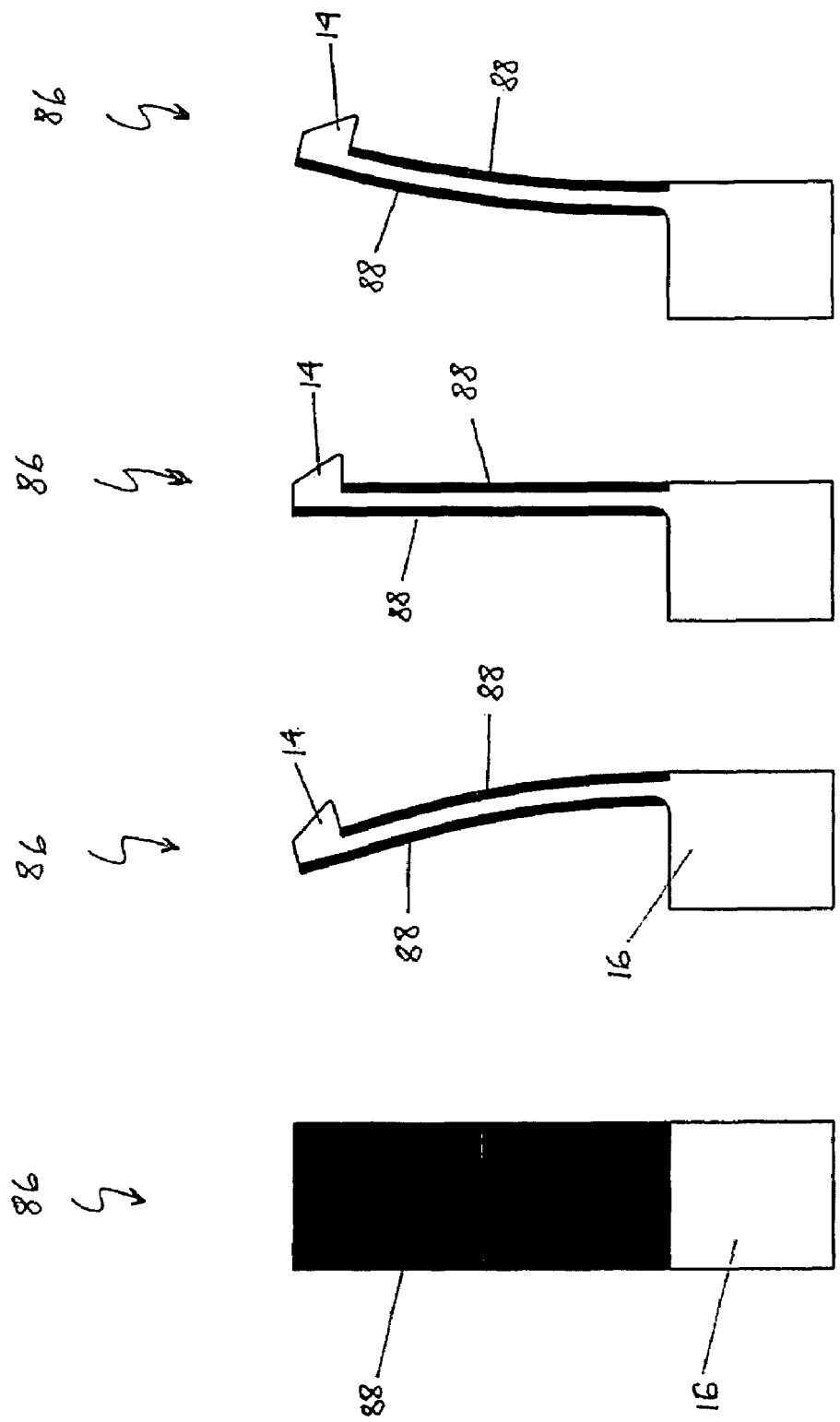
FIGS. 44 to 47 show a thirteenth embodiment.

FIGS. 44 to 47 show an embodiment of a bistable fastener 86. FIG. 44 is a rear view, FIG. 45 is a side elevation in the disengaged position, FIG. 46 is a side elevation in the engaged position and FIG. 47 is a side elevation of the fastener showing a slight bias towards the engaged position when the fastener is relaxed. This is to counteract any tendency of fastener 86 to disengage under load.

In this embodiment, rather than using shape memory alloy wire, fastener 86 has a sputter coating 88 of shape memory alloy. This sputter coating is applied both to the front and rear of flexible beam 12, in order to form a bi-stable fastener. When power is applied to the shape memory alloy coating on the rear of beam 12, the coating will contract and the beam will move to the position shown in FIG. 45. It will remain in that position until the coating on the front of beam 12 is subject to heat through power, when beam 12 will move towards the position shown in FIG. 47. Assuming that engagement means 14 encounters the required engaging surface (not shown), beam 12 will in fact be in the position shown in FIG. 46, although being biased towards the position shown in FIG. 47.

Figure 49:
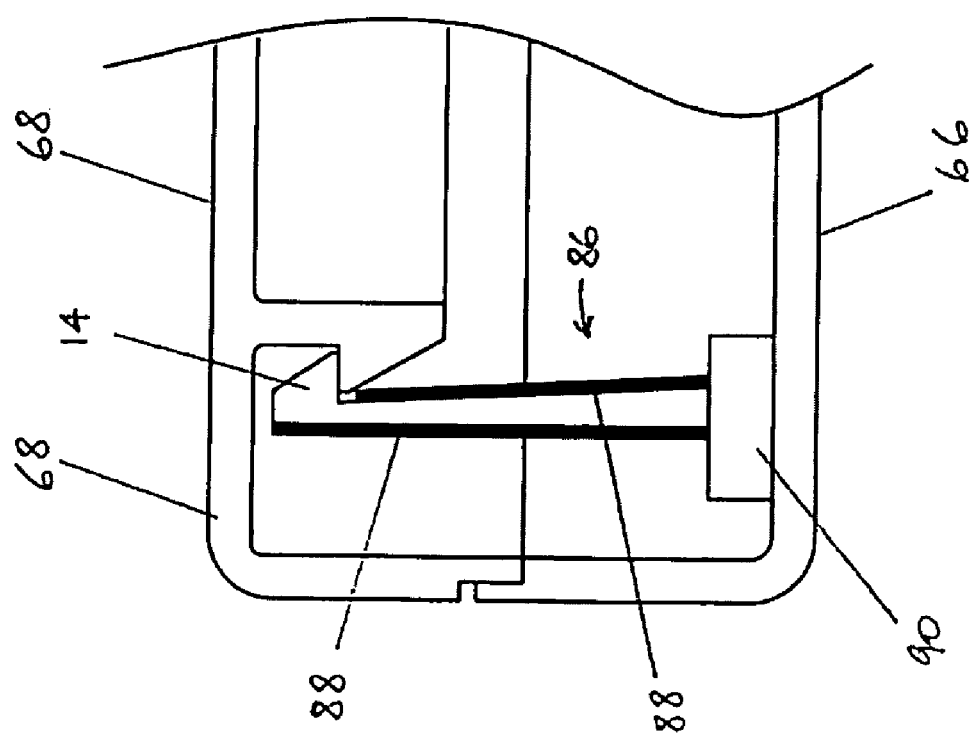
FIGS. 48 and 49 show an embodiment similar to that in FIGS. 44 to 47.
Figure 48:
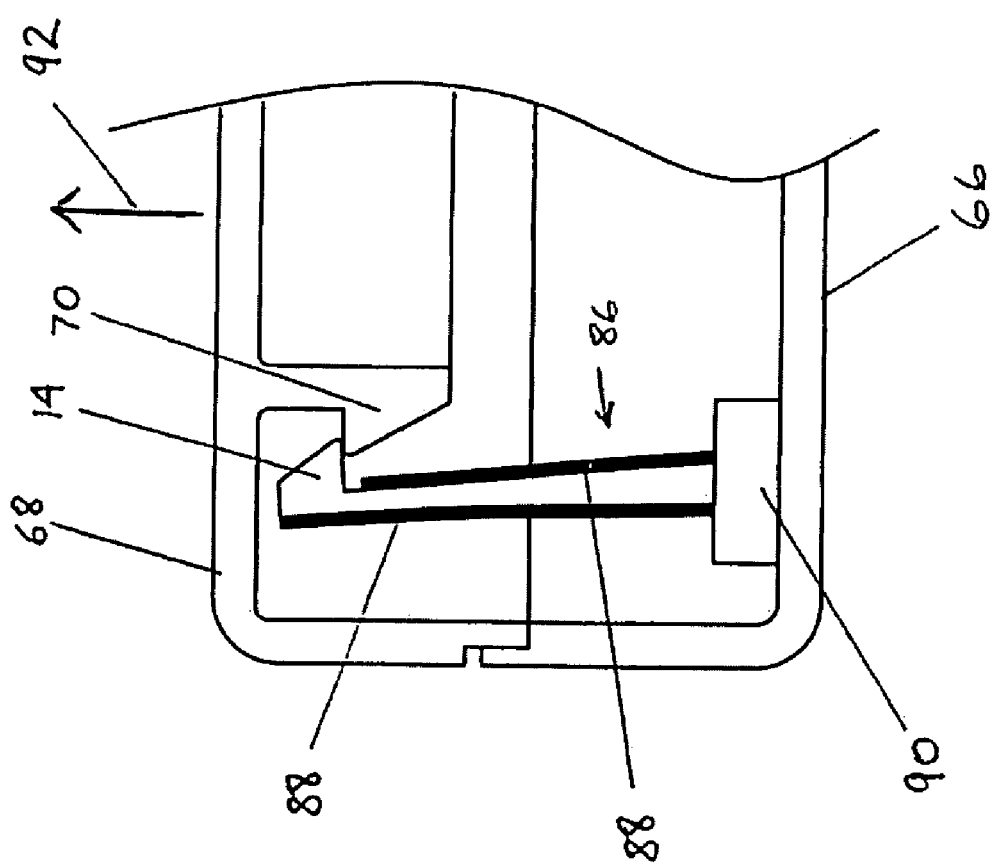

The embodiment in FIGS. 48 and 49 is similar to that in FIGS. 44 to 47, in that fastener 86 in FIGS. 48 and 49 has a shape memory alloy sputter coating on the front and rear of beam 12. However, fastener 86 in the embodiment in FIGS. 48 and 49 includes sensor 90.

Fastener 86 and sensor 90 are attached to base 66 of a product cover. Engagement means 14 engage with catch 70 which is integral with lid 68. If an attempt is made to force lid 68 away from base 66, engagement means 14 will tend to move off catch 70.

Sensor 90 senses this movement and counteracts it by causing the actuation of smart memory alloy 88 on the front of beam 12 to contract. Thus the tendency of fastener 86 to move to the configuration shown in FIG. 48 when an attempt is made to lift lid 68 in the direction of arrow 92 is resisted and fastener 86 moves to the securely engaged position shown in FIG. 49.

Figures 50, 51:
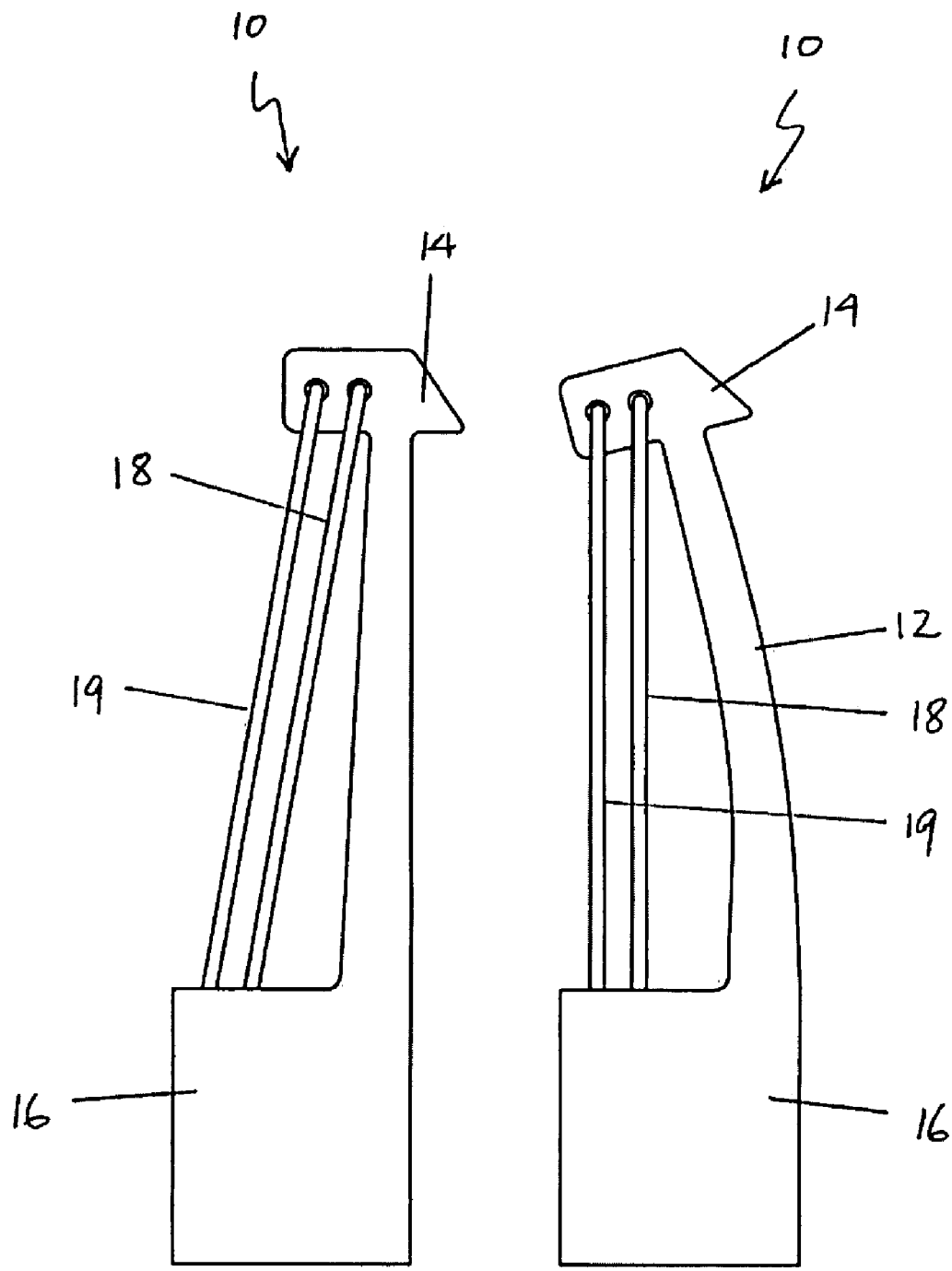
FIGS. 50 and 51 show a further embodiment of a fastener with redundancy.

The embodiment in FIGS. 50 and 51 has a redundant actuation mechanism. Fastener 10 has two shape memory wires 18 and 19. Either wire 18 or 19 can move beam 12 to the disengaged position. If wire 18 fails, wire 19 can be activated so that the fastener 10 can still operate.

FIGS. 52 to 55 show an embodiment where the fastener of the invention is used to engage a door and the assembly has the facility to lock the fastener into position. The locking arrangement can be supplied by an embodiment of the fastener of the invention.

Figure 54:
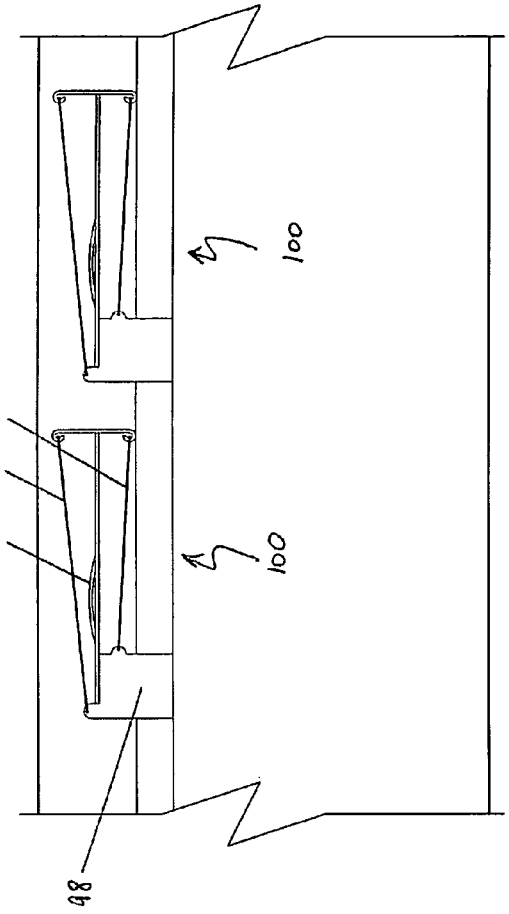
FIGS. 52, 53, 54 and 55 show an embodiment used for engaging a door and with the ability for locking the door.
Figure 52:
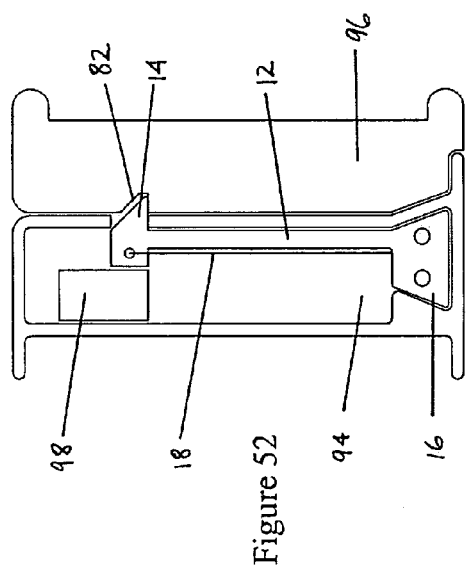
Figure 53:
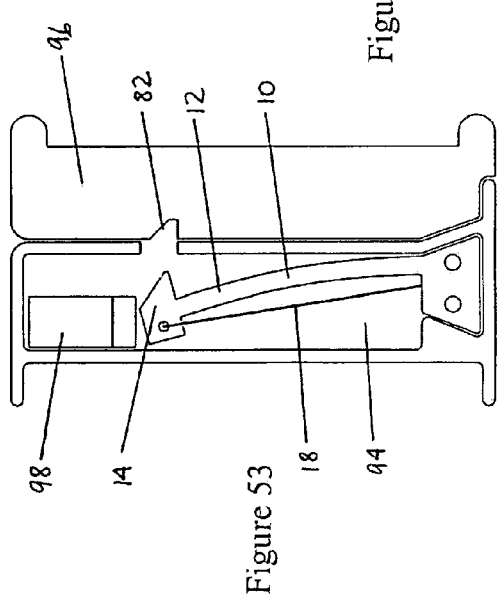

FIGS. 52 and 53 are sectional views through a door jamb 94 with FIG. 52 showing the fastener in the engaged and locked position and FIG. 53 showing the fastener in the disengaged and unlocked position. FIG. 54 is a longitudinal section, showing an embodiment of the fastener acting as a locking block.

In FIG. 52, fastener 10 is located in jamb 94. Engagement means 14 engages channel 82. Channel 82 extends for substantially the length of door 96. Fastener 10 extends linearly, in a similar way, so as to make continuous contact with channel 82.

In the engaged position shown in FIG. 52, locking block 98 has been moved into position behind engagement means 14.

In this configuration, even if wire 18 is activated to contract, engagement means 14 cannot be pulled out of channel 82, because of physical contact with locking block 98.

In order to release door 96, it is necessary to first withdraw locking block 98 as shown in FIG. 53 so that contraction of wire 18 can move beam 12 and engagement means 14, so that channel 82 is cleared.

It will be appreciated that locking takes place at the edge of door 96 and that the locking mechanism is hidden, enhancing security.

Locking block 98 is in fact the engagement means in a bistable fastener 100, which has an integrated clip 36, similar to the embodiment in FIGS. 25 to 27. FIG. 54 shows locking block 98 in the locked position, as in FIG. 52.

Figure 55:
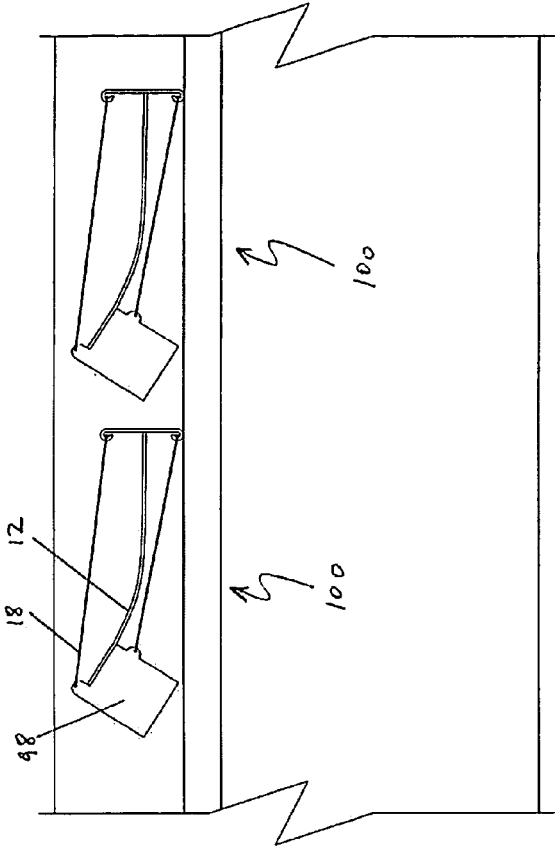

When wire 18 is activated as shown in FIG. 55, block 98 is pulled out of engagement with engaging means 14 and door 96 can accordingly open.

Because fastener 100 is bistable, it will remain in the position shown in FIG. 55 until wire 18*a* is activated in order to again lock block 98.

In the embodiment shown, fasteners 100 are discrete rather than linearly extending, since it is not necessary to lock the whole length of engagement means 14.

The arrangement in FIGS. 56 to 61 is similar in some respects to that in the previous embodiment. However, in FIGS. 56 to 61, locking block 98 is capable of assuming three positions. The first is the locked position shown in FIG. 56. The second is the unlocked position shown in FIG. 57 and the third, as shown in FIG. 58, is a position in which locking block 98 locks engaging means 14. Engaging means 14 has for this purpose a projection 102 which is engaged by a cutaway 104 on locking block 98 for this purpose.

FIGS. 62 and 63 show how the engaged or disengaged state of a fastener may be sensed by limit switches. When fastener 10 is in the engaged state shown in FIG. 62, limit switch 106 is turned on. When fastener 10 is in the disengaged position, as shown in FIG. 63, limit switch 108 is turned on and switch 106 is off.

FIGS. 64 and 65 illustrate the use of a single strain gauge to sense and fastener position. Strain gauge 110 is attached to the back of beam 12 (FIG. 64 being a side elevation and FIG. 65 being a rear view). Strain gauge 110 permits the position of the beam 12 to be determined with high resolution throughout its travel, typically 256 steps or more.

The embodiment in FIGS. 66 and 67 is similar, except that two strain gauges are used, 110*a* and 110*b*. Differential measurement between the strain gauges allows the position of beam 12 to be determined throughout its travel, with high resolution. Common mode measurement allows linear extension or compression of the fastener to be measured, and hence axial loading on the fastener to be determined.

In FIGS. 68 to 71, the size of the base to the fastener has been exaggerated for clarity of detail. These Figures show packaging and integration of intelligent forms of the fastener of the invention. While the fasteners used in these and the remaining Figures may be shown as the fasteners of the first aspect of the invention, the fastener of the second aspect of the invention may be substituted.

Figure 68:
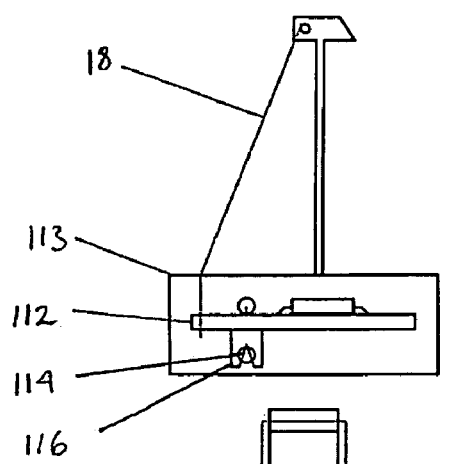
FIGS. 68 and 69 show an embodiment in connection with actuating mechanisms.
Figure 69:
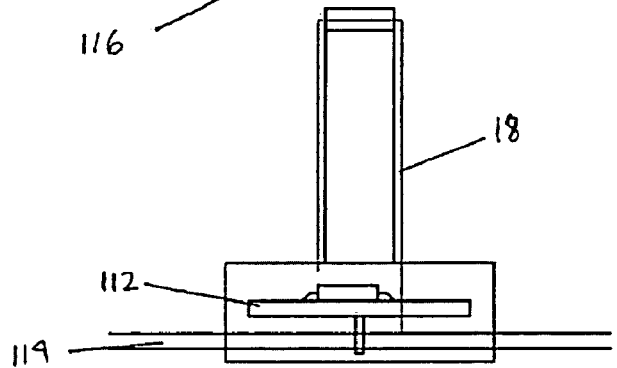

FIGS. 68 and 69 show a design in which wire 18 is attached to circuit board 112 and to a conductive base 113 for earth return connection. A single wire 114 carries power and superimposed communications and makes connection via an insulation displacement connector 116.

Figure 70:
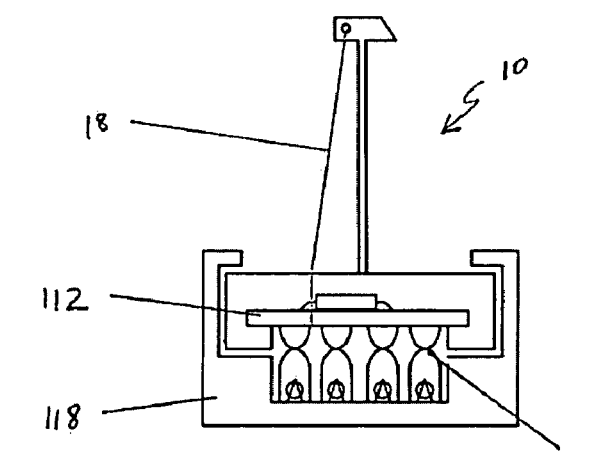
FIGS. 70 and 71 show a further embodiment in connection with actuating mechanisms.
Figure 71:
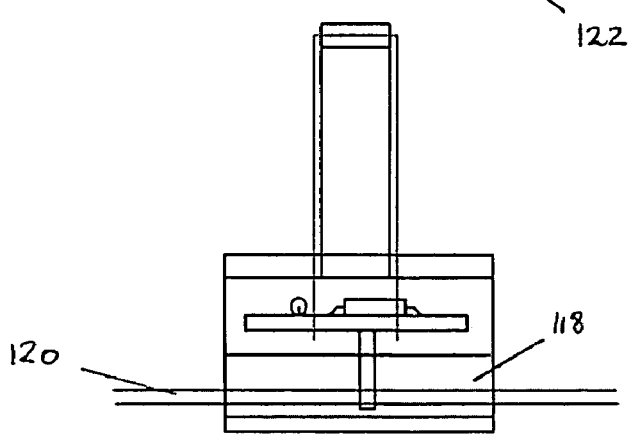

In the embodiment in FIGS. 70 and 71, fastener 10 clips into base 118. Wire 18 connects to printed circuit board 112, in this case integrated into fastener 10. Base 118 accommodates a four-way ribbon cable 120 which runs through base 118 and which is crimped into place. Cable 120 carried power and communication, with connection to fastener 10 by electrical contacts 122.

Figure 72:
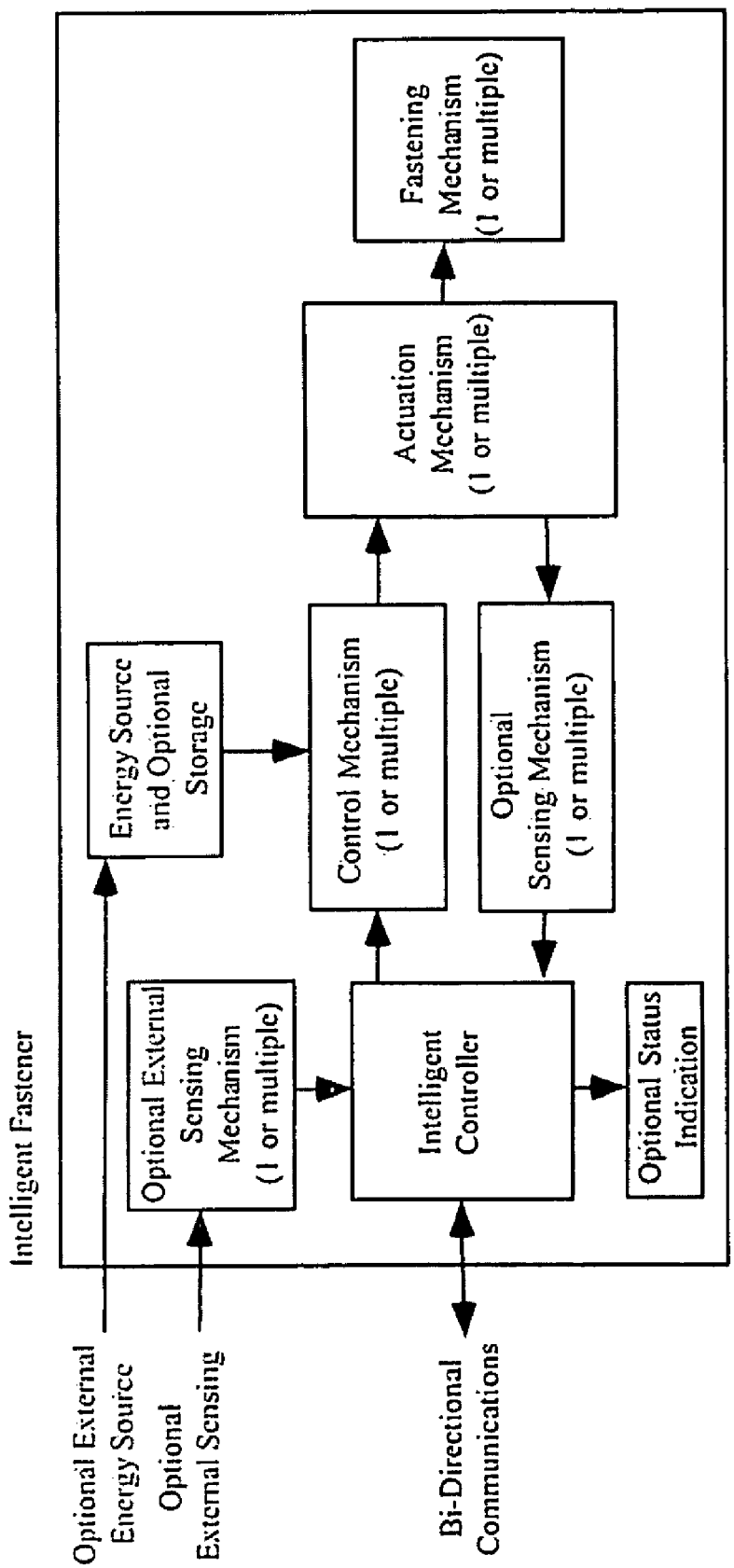
FIG. 72 is a block diagram of an embodiment of a fastener according to the invention.

FIG. 72 is a block diagram of an intelligent fastener configuration, applicable to either aspect of the fastener of the invention. It is self-explanatory.

Figure 73:
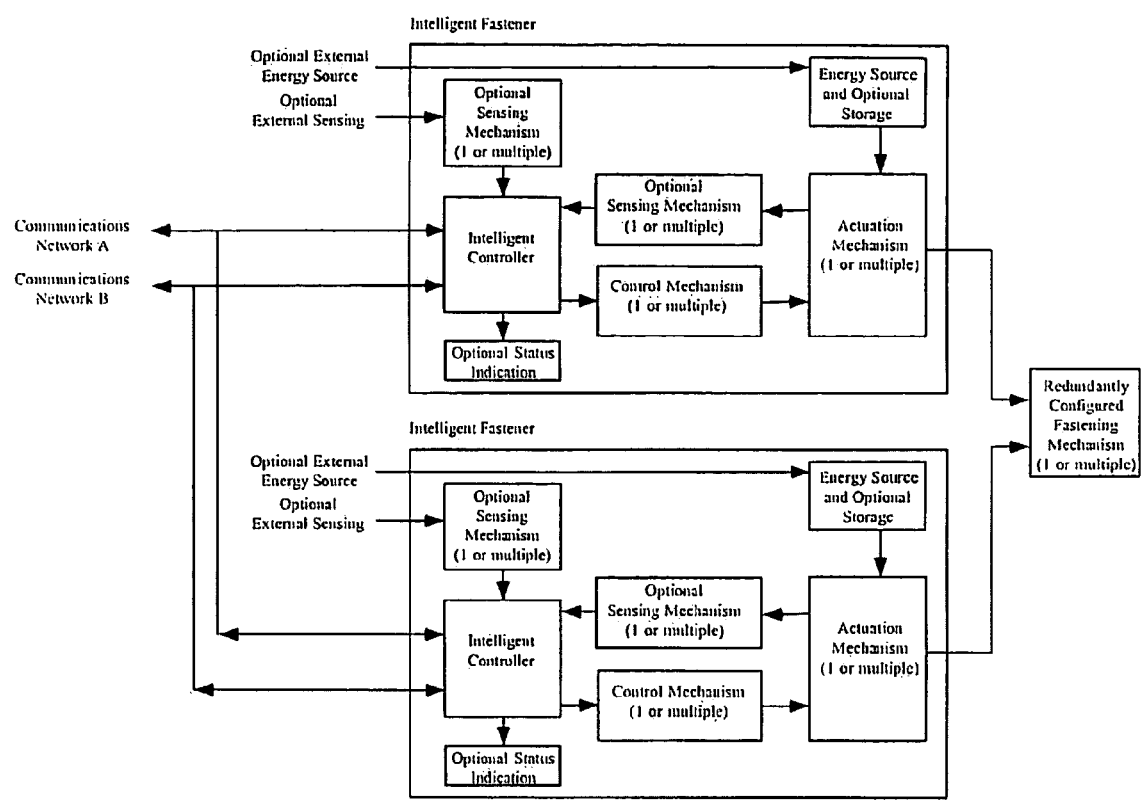
FIG. 73 is a block diagram for operating fasteners in a redundant system.

FIG. 73 is a block diagram representing a system for control of one or more redundant fasteners. Two intelligent controllers, each linked by two independent communications links, can individually control each fastener. In this way, full functionality can be maintained even in the event of failure of either a controller or a communications channel.

Figure 74:
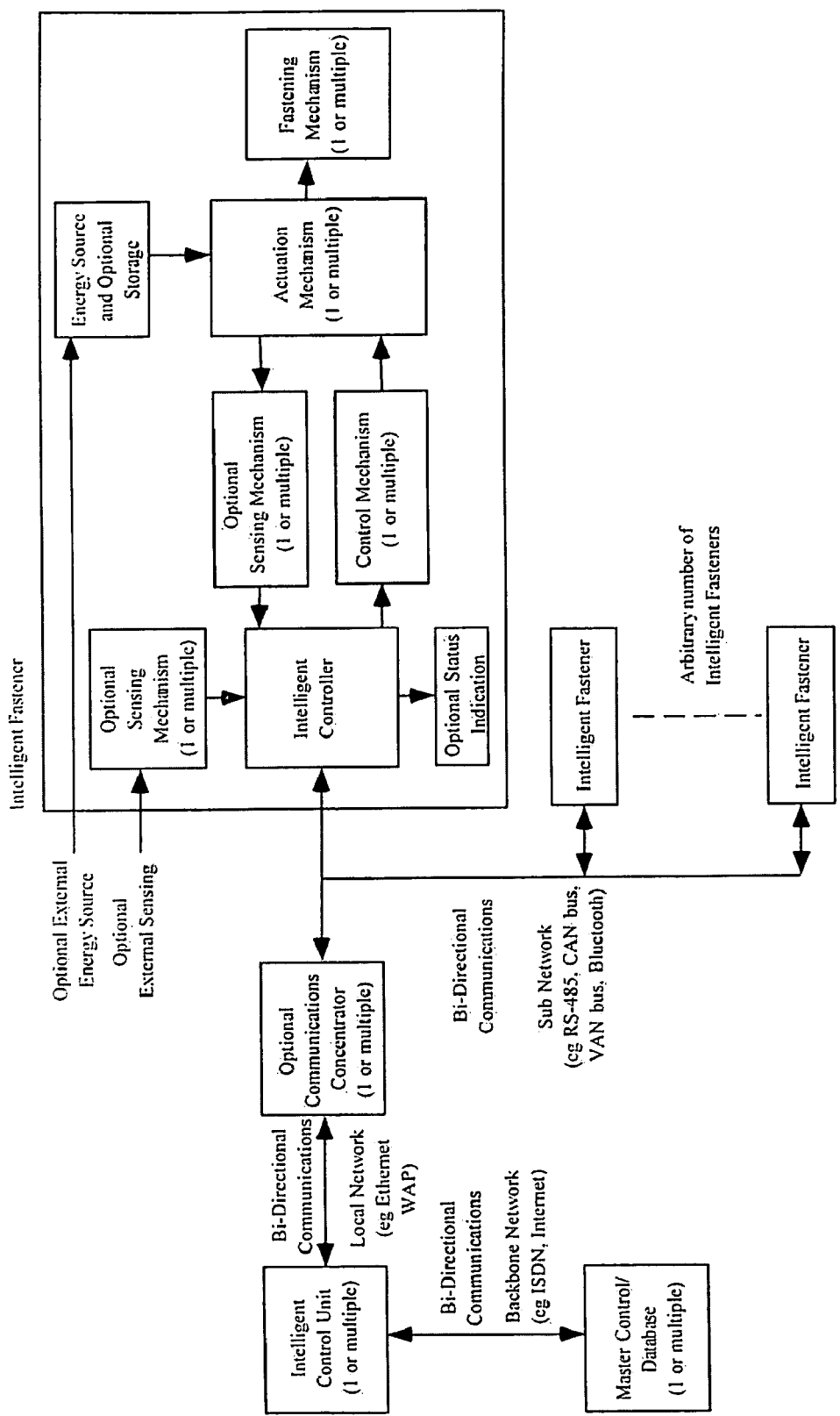
FIG. 74 is a block diagram showing a network of fasteners.

The block diagram in FIG. 74 represents a system of fasteners. Each intelligent fastener is as shown in FIG. 72. The communications concentrator, which is an optional element, provides a mechanism for partitioning system complexity, eg, by providing an interface between a relatively costly-to-implement radio frequency network and an inexpensive RS-485 network which interconnects a number of the fasteners via a subnetwork. The subnetwork may use any communications which may also be useful for the intelligent fastener, such as unidirectional, bi-directional, full duplex, half duplex, simplex, point-to-point, network, asynchronous and synchronous, via such techniques as electromagnetic radiation, radio (AM or FM), magnetic coupling, low frequency RF, microwave radio, spread spectrum radio, light (visible, infrared), optical fibre, electrical (wire, cable) or sonic (ultrasonic, audible or infra-sound).

The intelligent control unit may be a discrete device, an integrated circuit, a microcontroller, a microcomputer, a programmable logic device, a hybrid integrated circuit, an application specific integrated circuit, a printed wiring assembly or an embedded PC.

The optional sensing mechanism may be binary, multi-state or linear and operate by any of the following techniques: electrical (switch, contact, strain gauge, piezo-electric, piezo-resistive, magneto-resistive, resistive), magnetic/Hall effect, capacitive, optical acoustic/ultrasonic or mechanical.

The status indication may be optical, acoustic or mechanical.

The control mechanism may also be binary, multi-state or linear. It may operate by techniques such as electrical (swirch, relay/contactor, semiconductor, transistor, FET, thyristor, mechanical (lever, valve, piston) or biological (human or animal).

The energy source and optional storage may be local, external or a combination, using a technique such as primary or secondary cell or battery, mains derived power, capacitor or supercapacitor, electromagnetic radiation (RF or light), inductive coupling, acoustic, chemical, fuel cell, gravity, mechanical, kinetic or biological.

Figure 75:
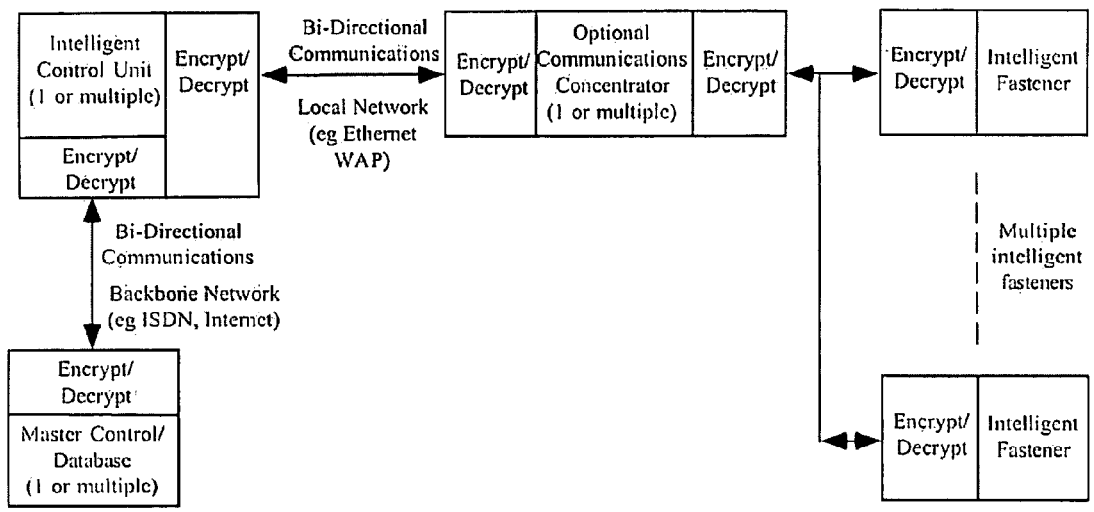
FIG. 75 is a block diagram showing a form of encryption.

Turning now to FIG. 75, this illustrates a form of link encryption, in which each communications link where the information (address data) may be intercepted is protected by encryption of information on that link.

Figure 76:
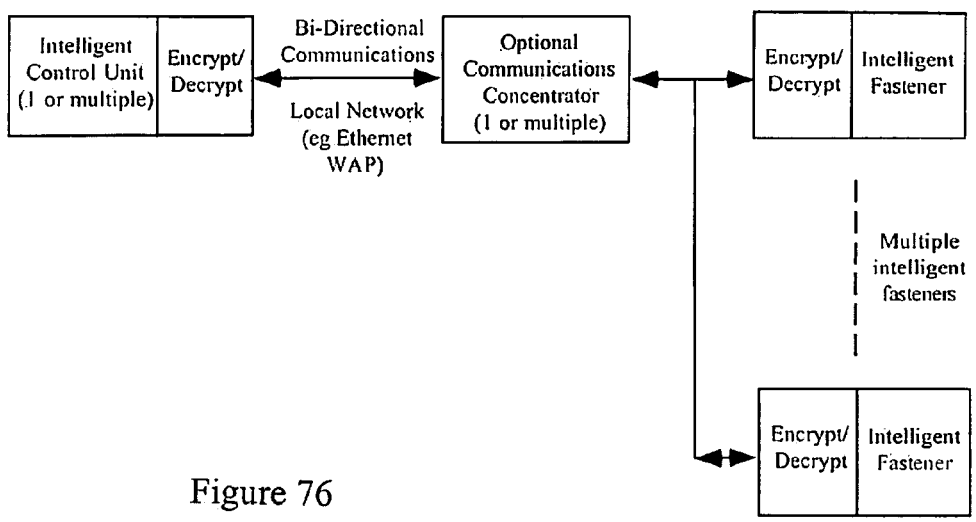
FIG. 76 is another block diagram showing a different form of encryption.

FIG. 76 shows a form of end-t-end encryption, where information is encrypted at its source and decrypted at its destination.

Figure 77:
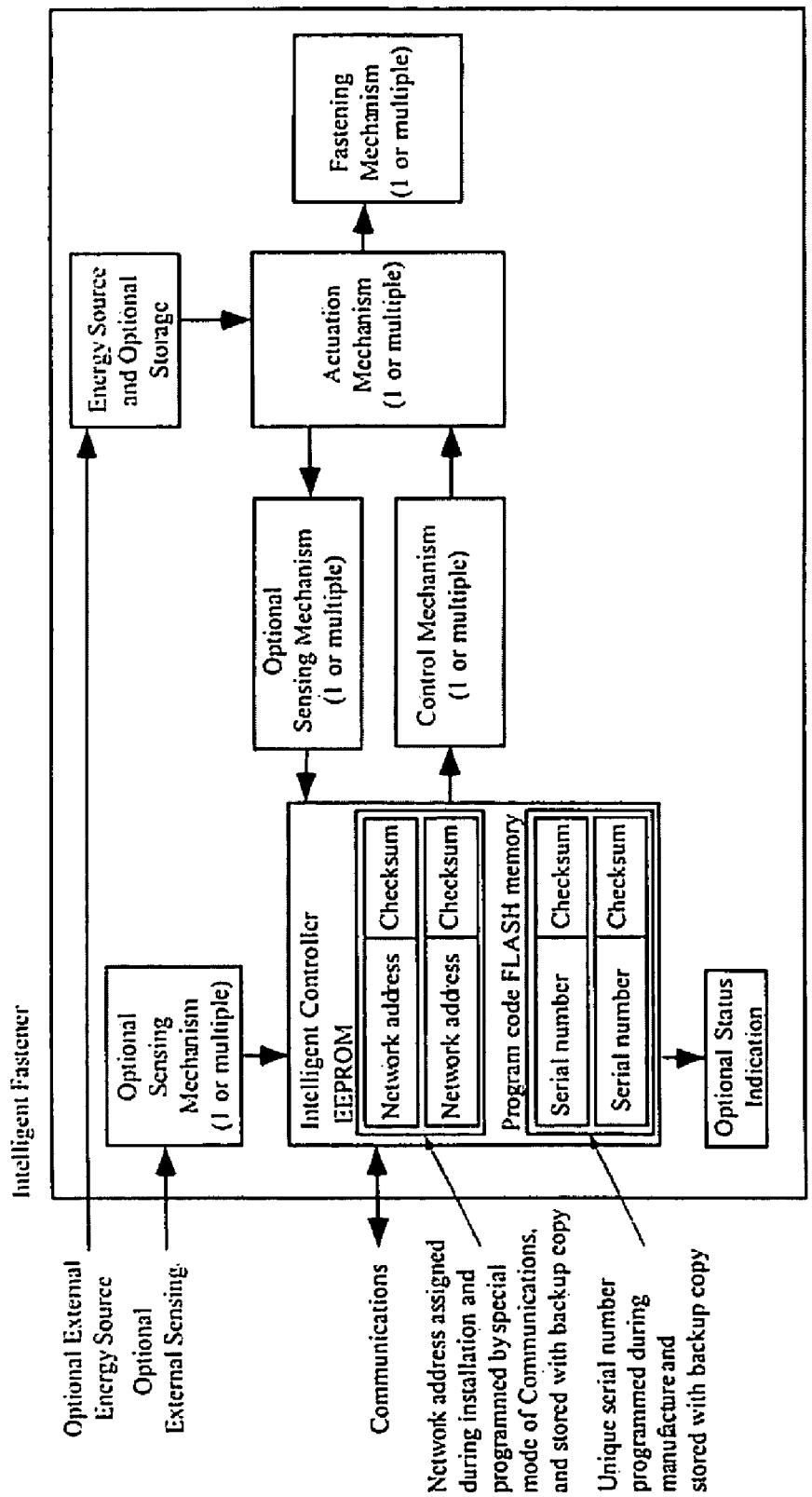
FIG. 77 is a block diagram dealing with address means.

FIG. 77 shows storage of a unique identity for a fastener, using a microcontroller-based intelligent controller which incorporates internal program code memory programmed with a unique serial number during manufacture. Also included is an EEPROM which stores a network address programmed as part of installation and commissioning. Each of these is stored redundantly with checksum protection.

Figure 78:
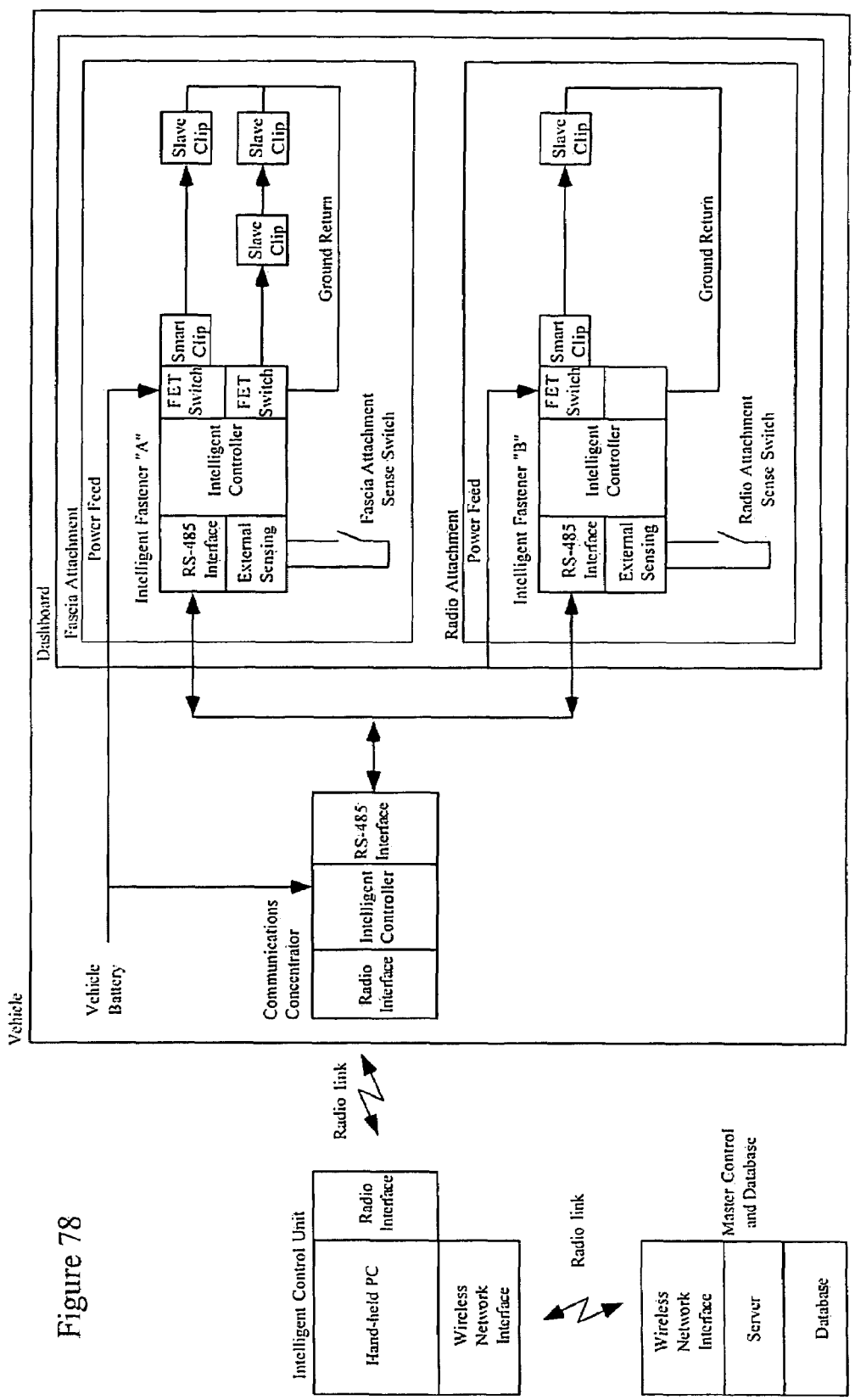
FIG. 78 is a block diagram relating to use of fasteners and network of the invention in a motor vehicle.

The block diagram in FIG. 78 embodies many of the concepts of the invention. The system shown consists of a fastening system for a car radio which is housed behind a fascia which must be removed before the radio can be removed or installed.

The fascia and radio are each retained by multiple fasteners similar to those shown in the early embodiments, above. The fascia is retained by intelligent fastener A which controls three "slave" fasteners wired in series/parallel combination. The radio is retained by intelligent fastener B which controls one slave fastener wired in series with the fastener. The intelligent fasteners have external sensing switches to determine whether or not the item attached by the fastener is in place. Power for fastener electronics and actuators is derived from the vehicle electrical system.

The handheld PC in the intelligent control unit runs custom software and the unit can report the installation or otherwise of the radio and fascia and can guide the operator through a step-by-step installation procedure.

The database in the master control unit may contain records relating to vehicles being serviced by the system.

Figure 79:
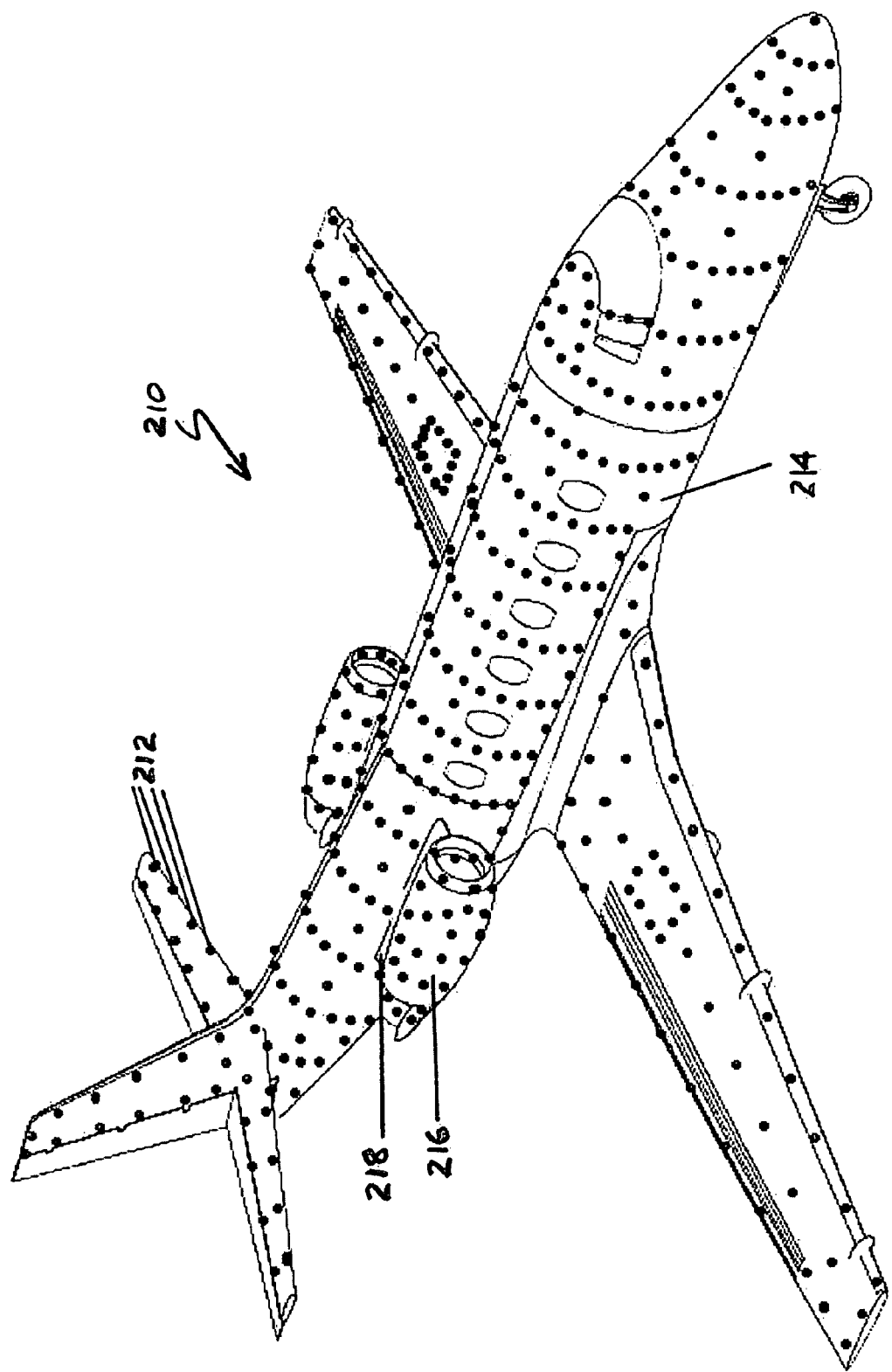
FIG. 79 is a perspective view of an aircraft showing a network of fasteners according to the invention.
Figure 80:
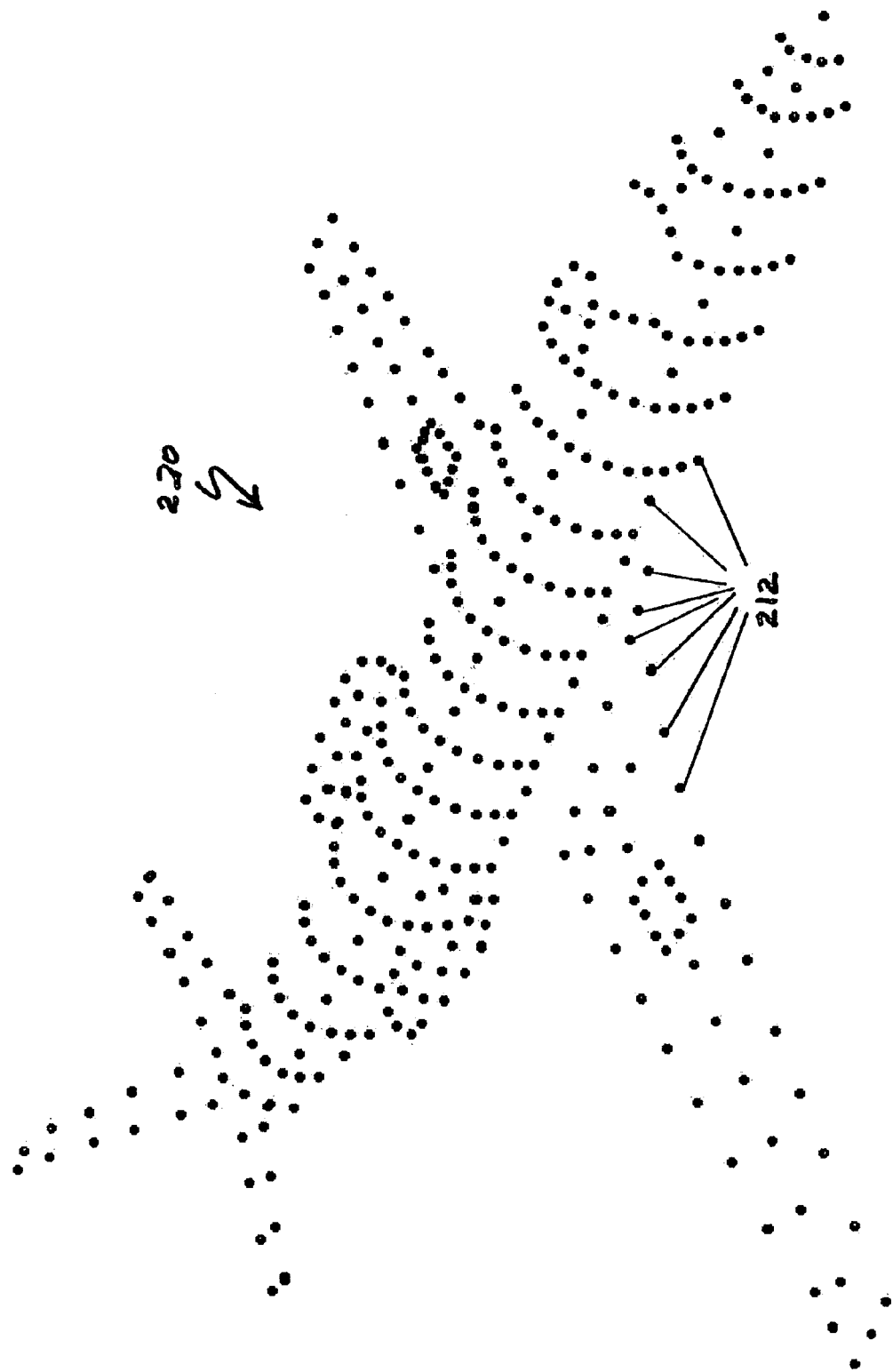
FIG. 80 shows the network of fasteners of FIG. 1 excluding the aircraft.

FIG. 79 shows an assembly which is an aircraft 210 having a network of fasteners 220 (refer FIG. 80) distributed throughout the aircraft. Each fastener 212 (some only are labelled) has a primary function of holding the aircraft assembly 210 together. The fasteners 212 are within some cases within the aircraft 210, in other cases just beneath the internal or external skin 214 of the aircraft 210 and in other cases penetrating the skin 214 (similarly to a rivet) on a conventional aircraft assembly.

It is an option that other fasteners (not shown) are included in aircraft 210 but are not part of the network of fasteners 220. Some of these fasteners which are not part of network of fasteners 220 may be present in case of need (redundancy) or may not be part of the network of the fasteners 220 for some other reason.

Fasteners 212 in network 220 may, for example, report on whether those fasteners 212 which hold engine 216 to mounting 218 are stressed in any way. If any stress is detected, other fasteners 212 in the vicinity of the stressed fasteners may increase the degree of fastening in order to make up for any shortcoming in fastening by the stressed fastener or fasteners.

Similarly, fasteners 212 located between skin 214 and the aircraft lining (not shown) may report on any significant rise in temperature, which may indicated commencement of a fire, for example in electrical cabling.

Although the invention has been described and illustrated in the foregoing exemplary embodiments, it is understood that the present disclosure has been made only by way of example, and that numerous changes in the details of construction and combination and arrangement of processes and equipment may be made without departing from the spirit and scope of the invention.

The invention claimed is:

1. A fastener which includes:
   (a) a fastening element having a flexible and linear beam having a length and an engagement means for engaging a catch, located at or near one end of the beam; and
   (b) actuating means attached to the beam at or near the one end of the beam, extending at an angle inclined to the length of the beam and terminating at or near another end of the beam, the actuating means including a material adapted to contract when activated;
   wherein the beam is moveable, upon contraction of the material of the actuating means, from an engagement position allowing the engagement means to engage the catch to a disengagement position allowing withdrawal of the engagement means from the catch.

2. The fastener of claim 1 in which the beam is made of plastic or metal.

3. The fastener of claim 1 wherein the engagement means is a wedge projecting from the beam, a rod or an aperture.

4. The fastener of claim 1 wherein the beam and engagement means are integral with the fastening element.

5. The fastener as claimed in claim 1, wherein in the material adapted to contract when activated is chosen from the group: shape memory wire, shape memory strip.

6. The fastener claimed in claim 5 wherein the material is a shape memory alloy or a shape memory strip and comprises the actuating means, attached to the fastening element near the engagement means.

7. The fastener claimed in claim 6, wherein the shape memory is wholly or substantially a titanium-nickel alloy.

8. The fastener claimed in claim 1, which includes insulating means around the actuating means.

9. The fastener claimed in claim 1, which includes a heat sink material on or around the actuating means.

10. The fastener claimed in claim 1, which includes two of the actuating means attached to the fastening element.

11. The fastener claimed in claim 10, in which the two actuating means are substantially parallel to each other.

12. The fastener of claim 10 wherein one of the actuating means is adapted to cause the beam to move to the disengagement position and the other actuating means is adapted to cause the beam to move to the engagement position.

13. The fastener of claim 10, which includes one or more switches for the actuating means.

14. The fastener of claim 1 which includes means to lock the fastener in the engagement position or in the disengagement position.

15. The fastener claimed in claim 1, wherein the material is adapted to contract when heated by application of an electric current.

16. The fastener claimed in claim 1, wherein the engagement means and flexible beam form a linearly extending strip.

17. The fastener claimed in claim 1, which is integral with a first element, the fastener being adapted in use to fasten the first element to a second element.

18. The fastener claimed in claim 1, where the engagement means comprises a broadened part of the flexible beam.

19. The fastener of claim 1, wherein the fastener includes address means.

20. The fastener claimed in claim 19, wherein the fastener includes sensing means.

21. A system including a plurality of fasteners of claim 20.

22. The system of claim 21, which includes one or more information processing means.

23. The system of claim 21, which includes one or more switching means.

24. The system of claim 21, which includes one or more control means, one or more sensors, an energy source, an intelligent control device and a status indicator.

25. A network including a plurality of systems as claimed in claim 21, at least one communications concentrator, at least one intelligent control unit and at least one master control/database unit.

26. A network of fasteners including a plurality of fasteners, each fastener according to claim 1.

27. The network of claim 26, which includes one or more information processing means.

28. The network of claim 26, which includes one or more switching means.

29. The network of claims 26, which includes one or more control means, one or more sensors, an energy source, an intelligent control device and a status indicator.

30. The network of claim 26, which includes at least one communications concentrator, at least one intelligent control unit and at least one master control/database unit.

31. The network of claims 26, wherein the fasteners are networked by hard wiring or by wireless means.

32. The network of claim 31, wherein the wireless means is chosen from the group consisting of wireless link, radio link, inductive coupling, infra-red, microwave, visible light and ultra-sound.

33. The network of claim 31, wherein the wireless link includes a global positioning system, SMS, MMS, GPRS, or WiFi to an internet access point.

34. The network of claim 26, wherein the fasteners are distributed throughout the assembly to provide a three-dimensional model of the assembly.

35. The network of claim 26, wherein the assembly is a building, a motor vehicle, a water craft or an aircraft or any other manufactured product.

36. The network of claim 26, wherein at least some of the fasteners are multifunctional, having at least one function in addition to a fastening function.

37. The network of claim 36, wherein the multifunctional fasteners have more than one additional function.

38. The network of claim 37, wherein each multifunctional fastener includes a sensor.

39. The network of claim 38, wherein the sensor is adapted to sense light, heat, sound or a chemical substance, vibration, stress or humidity.

40. The network of claim 39, wherein the first group of fasteners is adapted to generate data for comparison with data generated by the second group of fasteners.

41. The network of claim 26, which includes a first group of multifunctional fasteners and a second group of multifunctional fasteners.

42. A process for producing product, the process including a plurality of steps in which a first element is releasably fixed to a second element, the steps comprising:
    providing a first element and a second element;
    providing a fastener according to claim 1; and
    using the fasteners to releasably fix the first element to the second element.

43. A computer system programmed to perform the process of claim 42.

* * * * *